(12) United States Patent
Tombez

(10) Patent No.: US 12,276,498 B2
(45) Date of Patent: Apr. 15, 2025

(54) ANGULAR POSITION SENSOR SYSTEM

(71) Applicant: Melexis Technologies SA, Bevaix (CH)

(72) Inventor: Lionel Tombez, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 261 days.

(21) Appl. No.: 17/730,796

(22) Filed: Apr. 27, 2022

(65) Prior Publication Data

US 2022/0357144 A1    Nov. 10, 2022

(30) Foreign Application Priority Data

May 7, 2021    (EP) ..................................... 21172893

(51) Int. Cl.
*G01B 7/30*    (2006.01)
*G01D 5/14*    (2006.01)
*G01D 5/244*    (2006.01)

(52) U.S. Cl.
CPC ............... *G01B 7/30* (2013.01); *G01D 5/145* (2013.01); *G01D 5/24466* (2013.01)

(58) Field of Classification Search
CPC ....... G01B 7/30; G01D 5/145; G01D 5/24466
See application file for complete search history.

(56) References Cited

U.S. PATENT DOCUMENTS

| 7,307,416 B2* | 12/2007 | Islam ..................... G01D 5/145 324/207.2 |
| 2021/0055132 A1 | 2/2021 | Bondar et al. |
| 2021/0348945 A1* | 11/2021 | Bidaux ................. H01F 7/0294 |
| 2022/0196435 A1* | 6/2022 | Schott .................. G01D 5/2452 |

FOREIGN PATENT DOCUMENTS

WO    98/54547 A1    12/1998

OTHER PUBLICATIONS

Extended European Search Report from corresponding EP Application No. 21172893.6, Oct. 8, 2021.

* cited by examiner

*Primary Examiner* — Reena Aurora
(74) *Attorney, Agent, or Firm* — Workman Nydegger

(57) ABSTRACT

An angular position sensor system includes a two-pole magnet rotatable about a rotation axis; a magnetic sensor device having a plurality of horizontal Hall elements including at least a first, second and third horizontal Hall element located on a virtual circle having a centre located on the rotation axis. The Hall elements are spaced by multiples of 90. The magnetic sensor device has a processing unit connected to the horizontal Hall elements for obtaining a first, second and third signal, and for determining a first pairwise difference between the first and second sensor signal, and for determining a second pairwise difference between the second and third sensor signal, and for determining an angular position of the magnet relative to the sensor device based on a ratio of these pairwise differences.

12 Claims, 12 Drawing Sheets

FIG 1(a)  FIG 1(b)

$d1 = h1 - h3$
$d2 = h2 - h4$
$\theta m = \arctan(d1/d2)$

ANGULAR POSITION SENSOR SYSTEM

FIELD OF THE INVENTION

The present invention is related in general to angular position sensor systems having a two-pole magnet and having a 360° measurement range.

BACKGROUND OF THE INVENTION

Angular position sensor systems are known in the art. In such systems typically a non-uniform magnetic field is generated (e.g. by means of a static electrical current, or by means of a permanent magnet) and is measured by a sensor device comprising one or more sensors and a readout circuit and a processor which calculates an angular position based on the measured values.

Various sensor systems and various techniques for determining an angular position are known in the art, each having its advantages and disadvantages, for example in terms of cost, compactness, angular range, accuracy (e.g. signal-to-noise SNR), signal sensitivity, robustness against unwanted external fields (strayfield), robustness against position errors (e.g. due to axial and/or radial offset of the sensor versus the magnet), processing complexity, redundancy (e.g. error detection capabilities, error correction capabilities), etc.

WO98/54547 describes a magnetic rotation sensor system comprising a two-pole magnet and a sensor device having four Hall elements.

There is always room for improvements or alternatives.

SUMMARY OF THE INVENTION

It is an object of embodiments of the present invention to provide an angular position sensor system suitable for automotive applications.

It is an object of embodiments of the present invention to provide an angular position sensor system comprising: a two-pole magnet and a sensor device, where the sensor device is movable relative to the magnet, or vice versa, and is capable of measuring an angular position of said sensor device relative to the magnet in a 360° range.

It is an object of embodiments of the present invention to provide an angular position sensor system, wherein the sensor device comprises a relatively small number (or a reduced number) of magnetic sensor elements (e.g. only three magnetic sensor elements).

It is an object of embodiments of the present invention to provide an angular position sensor system, which is highly insensitive to an external disturbance field, and/or which is highly insensitive to ageing effects, and/or which is highly insensitive to demagnetisation effects, and preferably all of these.

It is an object of embodiments of the present invention to provide an angular position sensor system, with error detection capabilities (e.g. capable of detecting that one of the sensor elements is defective).

It is an object of embodiments of the present invention to provide an angular position sensor system, with error correction capabilities (e.g. capable of providing the correct angular position, even if one of the sensor elements is defective).

It is an object of embodiments of the present invention to provide an angular position sensor system, which is more compact (e.g. requires a smaller semiconductor substrate) without decreasing the accuracy (e.g. in terms of signal-to-noise SNR).

It is an object of embodiments of the present invention to provide an angular position sensor system, wherein the angle is calculated in a relatively simple manner (e.g. without requiring a Discrete Fourier Transform).

It is an object of embodiments of the present invention to provide an angular position sensor system which is suitable for functional safety applications.

It is an object of preferred embodiments of the present invention to provide an angular position sensor system, having at least two or at least three of the following characteristics: reduced number of magnetic sensor elements, 360° range, robust against external disturbance field, error detection capabilities, error correction capabilities, compact sensor device.

These and other objects are accomplished by a position sensor system, and methods according to embodiments of the present invention.

According to a first aspect, the present invention provides an angular position sensor system, comprising: a two-pole magnet rotatable about a rotation axis; a magnetic sensor device comprising a plurality of horizontal Hall elements including at least a first, a second and a third horizontal Hall element located on a virtual circle, the circle having a centre located on the rotation axis; wherein the first and the second horizontal Hall element are angularly spaced by 90°, and wherein the first and the third horizontal Hall element are angularly spaced by 180°; wherein the magnetic sensor device further comprises a processing unit connected to the first, second and third horizontal Hall element for obtaining a first, second and third signal, and configured for determining a first pairwise difference between the first and second sensor signal, and for determining a second pairwise difference between the second and third sensor signal, and for determining an angular position of the magnetic sensor device relative to the magnet based on a ratio of the first and the second pairwise difference, for example as an arc tangent or as an arc cotangent of said ratio.

It is an advantage that this angular position sensor system has a 360° range.

It is an advantage that the angle thus determined is highly insensitive to an external disturbance field (thanks to the signal differences) and is highly insensitive to the mounting distance between the sensor device and the magnet (thanks to the ratio).

It is an advantage that only three horizontal Hall elements are required for determining the angular position. Depending on the implementation, this allows for example a faster readout (because only three sensor elements need to be read), and/or allows a simpler circuit.

The magnet may be an axially or diametrically magnetized two-pole ring or disk magnet.

The first, second and third horizontal Hall element are preferably integrated in a single semiconductor substrate.

It is an advantage that the sensor device does not contain magnetic flux concentrators (also known as "integrated magnetic concentrators", IMC). This requires less processing steps during production of the sensor device, and may reduce lifetime issues e.g. due to delamination effects.

Preferably each of the horizontal Hall elements has an axis of maximum sensitivity parallel to the rotation axis.

The processing unit may be adapted for calculating said relative position in accordance with the formula: $\theta = \arctan(R)$, wherein $R = DIFF1/DIFF2$, and wherein $DIFF1 = (h1-h2)$ or $DIFF1 = (h2-h1)$, and wherein $DIFF2 = (h3-h2)$ or $DIFF2 = (h2-h3)$, wherein h1 is the first sensor signal, h2 is the second sensor signal, and h3 is the third sensor signal.

In an embodiment, the imaginary circle has a radius R1, and the horizontal Hall elements are integrated on a single semiconductor substrate having an area smaller than four times the square of said radius.

It is an advantage of this sensor device that the three sensor elements are located on a circle with radius R, while the semiconductor substrate has an area smaller than 4*R*R, which is the area of the smallest square containing the entire circle. This allows the size of the semiconductor substrate to be reduced, without reducing the radius.

In an embodiment, the sensor device comprises only three horizontal Hall elements.

It is an advantage that this sensor device requires a smaller number of components, hence the risk of defective components is reduced.

In an embodiment, the plurality of horizontal Hall elements further comprises a fourth horizontal Hall element situated on said imaginary circle, and spaced 180° from the second horizontal Hall element, and wherein the processing unit is further connected to the fourth horizontal Hall element for receiving a fourth sensor signal; and wherein the processing unit is further configured for one or more or all of the following: i) determining a third pairwise difference between the third sensor signal and the fourth sensor signal, and for determining a second angle of the magnetic sensor device based on a ratio of the second pairwise difference and the third pairwise difference; ii) determining a third pairwise difference between the third sensor signal and the fourth sensor signal, and determining a fourth pairwise difference between the first sensor signal and the fourth sensor signal, and for determining a third angle of the magnetic sensor device based on a ratio of the third pairwise difference and the fourth pairwise difference; iii) determining a fourth pairwise difference (between the first sensor signal and the fourth sensor signal, and for determining a fourth angle of the magnetic sensor device based on a ratio of the fourth pairwise difference and the first pairwise difference.

It is an advantage that this sensor device can determine more than one angular position, using different combinations of only three sensors. This provides redundancy, which can be used for fault-detection.

Indeed, two or more of these angles may be compared, and if these angle values deviate less than a predefined value, it can be concluded that all sensor elements are functioning correctly. In this case, two or three or all angles may be averaged, thus achieving an improved accuracy.

Thus, comparison of the angles allows at least error detection, but if the device can also figure out which sensor element is functioning incorrectly, it even allows error correction, by using the angle based on the three correctly functioning Hall elements.

In an embodiment, determining which sensor element is defective is based on analysing four difference signals d12=(h1-h2), d23=(h2-h3), d34=(h3-h4) and d41=(h4-h1), which should be 90° phase shifted, if all sensor elements are functioning correctly. For example, if h4 is defective, then d12 and d23 will be 90° phase shifted, but d23 and d34 will typically not be 90° phase shifted, and d34 and d41 will typically not be 90° phase shifted, and d41 and d12 will typically not be 90° phase shifted. Thus, by testing which of the signals d12, d23, d34 and d41 are 90° phase shifted, it can be determined which sensor element is defective.

In an embodiment, the processing unit is further configured for determining a first diagonal difference as a difference between the first signal and the third signal, and for determining a second diagonal difference as a difference between the second signal and the fourth signal, and for determining a fifth angle of the magnetic sensor device based on a ratio of these diagonal differences.

In this embodiment, a fifth angle is determined in the same way as illustrated in FIG. 1(c). This fifth angle has an improved signal-to-noise. Thus, in this embodiment, the advantages of FIG. 1 are combined with the error detection and/or error correction capabilities of FIG. 3(b).

In an embodiment, the plurality of horizontal Hall elements further comprises a fourth, a fifth and a sixth horizontal Hall element located on a second virtual circle, the second circle having a second centre located on the rotation axis; and wherein the processing unit is further connected to the fourth, the fifth and the sixth horizontal Hall element, and is further configured for receiving a fourth, a fifth and a sixth sensor signal; and wherein the processing unit is further configured for determining a first additional pairwise difference between the fourth and the fifth sensor signal, and for determining a second additional pairwise difference between the fifth and the sixth sensor signal, and for determining an additional angle of the magnetic sensor device relative to the magnet based on a ratio of the first additional pairwise difference and the second additional pairwise difference.

It is an advantage of this embodiment that the first, second and third horizontal Hall element can be used as a first set of three sensors, and that a first angular position can be calculated based on signals obtained from this first set of sensors; and that the fourth, fifth and sixth horizontal Hall elements can be used as a second set of three sensors, and that a second angular position can be calculated based on signals obtained from this second set of sensors, independent from the first set. Thus, the first set may be used as a main set, and the second set may be used as a redundant set, e.g. for error detection.

Depending on the implementation, the accuracy of the second angle obtained from the second set may be equal to, or smaller than the accuracy of the first angle, obtained from the first set.

The processing unit may be further adapted for comparing the first angle and the second angle, and for detecting an error in case the first and second angle deviate more than a certain threshold, and for outputting a result of the comparison. Alternatively, or additionally, the processing unit may be configured or outputting both angle values, for allowing an external processor to do the comparison.

In an embodiment, the first circle has a first radius (R1) and the second circle has a second radius (R2) equal to the first radius (R1).

In an embodiment, the first circle has a first radius (R1) and the second circle has a second radius (R2) smaller than the first radius (R1).

In an embodiment, the fourth and fifth horizontal Hall element are angularly spaced apart by an angle in the range from 80° to 89° or from 91° to 100°, and wherein the fifth and sixth horizontal Hall element are angularly spaced apart by an angle in the range from 80° to 89° or from 91° to 100°.

An example of this embodiment is shown in FIG. 4(b). It is an advantage of this embodiment that all horizontal Hall elements are located on a single imaginary circle, hence providing substantially the same signal amplitude. The second and the fifth horizontal Hall element may be angularly spaced by 180°, in which case a "diagonal difference" (h2-h5) can also be calculated (e.g. in case no error was detected), and the first angle and the second angle are 180° offset from each other.

It is possible in this case to locate the first set of sensor elements on "a first portion" of the semiconductor substrate, and to locate the second set of sensor elements on "a second portion" of the semiconductor substrate, not overlapping the first portion, e.g. as illustrated in FIG. 4(e).

In an embodiment the first set of sensor elements and its biasing and readout circuit is galvanically separated from the second set of sensor elements and its biasing and readout circuit. In this embodiment, at least the "first portion" has a processing unit inside the device. Optionally the second portion also has a second processing unit inside the device, but that is not absolutely required. Alternatively, or additionally, the second portion is configured for outputting the measured values, and/or the pairwise differences, preferably in digital format, after analog-to-digital conversion, for allowing an external processor to perform the consistency check.

In an embodiment, the fourth and fifth horizontal Hall element are spaced apart by 90°, and the fifth and sixth horizontal Hall element are also spaced apart by 90°, in the sense that the fourth and sixth element are spaced by 180°.

An example of this embodiment is shown in FIG. 4(c), where the sixth Hall element is situated (on the arc) "between" the first and the second Hall element.

It is an advantage of this embodiment that both the first and the second angle can be calculated using a simple arctangent of a ratio of two difference signals, and also the second angle can be calculated using a simple arctangent of a ratio of two difference signals. It is also an advantage of this embodiment that both angles can be calculated with the same accuracy.

In an embodiment, the first virtual circle has a first radius R1, and the second virtual circle has a second radius R2 smaller than the first radius R1; and the first, third, fourth and sixth horizontal Hall element are collinear.

In this embodiment, the processor unit may be further configured to test whether the signal (h1-h3) is proportional to (h6-h4) to detect an error.

In an embodiment, the first virtual circle has a first radius R1, and the second virtual circle has a second radius R2 equal to or smaller than the first radius R1; and a distance between a centre of the first and a centre of the fourth Hall element is smaller than 250 m; and a distance between a centre of the second and a centre of the fifth Hall element is smaller than 250 m; and a distance between a centre of the third and a centre of the sixth Hall element is smaller than 250 m.

In an embodiment, these distances are smaller than 200 µm, or smaller than 150 µm, or smaller than 100 µm, or smaller than 50 µm.

Examples of this embodiment are shown in FIG. 4(d) and FIG. 5(b). By arranging the sensor elements relatively close together, the semiconductor substrate can be more compact, and/or the signals from nearly sensor elements may be combined (e.g. connected in parallel or in series).

In an embodiment, the semiconductor substrate has an area in the range from 51% to 98% of $4*(R1)*(R1)$, or in the range from 51% to 95% of $4*(R1)*(R1)$, or in the range from 55% to 95% of $4*(R1)*(R1)$, or in the range from 55% to 90% of $4*(R1)*(R1)$, or in the range from 55% to 80% of $4*(R1)*(R1)$, where R1 is the radius of the (first) imaginary circle.

Such implementation offers redundancy, and at the same time require less space (more compact and cheaper), which is a major advantage.

In an embodiment, the processor unit is configured for outputting at least two angular values (e.g. $\theta 1$, $\theta 2$), and wherein the angular position sensor system further comprises an electronic control unit (ECU) communicatively connected to the magnetic sensor device, and configured for receiving said at least two angular values, and further configured for detecting an error based on a comparison of the first and second angular value.

In this embodiment, the processing unit determines the two angles and optionally compares them, and the external processing unit receives the two angles, and also compares them.

Optionally the electronic control unit may be further adapted for adding or subtracting a predefined offset to/from the second angle value before comparing them.

In an embodiment, the processor unit is configured for outputting at least a first angular value (e.g. $\theta 1$) and at least two difference signals; and the angular position sensor system further comprises an electronic control unit (ECU) communicatively connected to the magnetic sensor device; and the electronic control unit (ECU) is configured for receiving the first angular value (e.g. $\theta 1$) and the at least two difference values, and is further configured for calculating a second angular value (e.g. $\theta 2$) based on these difference values, and for detecting an error based on a comparison of the first and second angular value (01, $\theta 2$).

Optionally the electronic control unit may be further adapted for adding or subtracting a predefined offset to/from the second angle value before comparing them.

In an embodiment, the plurality of horizontal Hall elements further comprises a fourth horizontal Hall element (e.g. H4) situated on said imaginary circle, and spaced 180° from the second horizontal Hall element (e.g. H2), and the processing unit is further connected to the fourth horizontal Hall element for receiving a fourth sensor signal (e.g. h4); and the processing unit is further configured for determining a first diagonal difference (e.g. dd1) as a difference between the first signal (e.g. h1) and the third signal (e.g. h3), and for determining a second diagonal difference (e.g. dd2) as a difference between the second signal (e.g. h2) and the fourth signal (e.g. h4), and optionally for determining a second angle (e.g. $\theta 5$) of the magnetic sensor device based on a ratio of these diagonal differences; and wherein the sensor device is further configured for outputting said angular position (e.g. $\theta$) which was derived from the first, second and third horizontal Hall element as a first angle, and for outputting at least one of said first and said second diagonal difference (e.g. dd1, dd2) and said second angle (e.g. $\theta 5$).

In an embodiment, the sensor device is configured for determining said second angle (e.g. $\theta 5$), and for performing a consistency test between said first angle (e.g. $\theta$) which was derived from only three horizontal Hall elements, and said second angle (e.g. $\theta 5$) which was derived from the diagonal differences, and for outputting a result of the consistency test.

In an embodiment, the system further comprises an electronic control unit (e.g. ECU) communicatively connected to the magnetic sensor device; and the electronic control unit (e.g. ECU) is configured for receiving the first angular value (e.g. 0) and the second angular value (e.g. $\theta 5$), and for detecting an error based on a comparison of the first and the second angular value (e.g. 0, $\theta 5$).

In an embodiment, the system further comprises an electronic control unit (e.g. ECU) communicatively connected to the magnetic sensor device; and the electronic control unit (e.g. ECU) is configured for receiving the first angular value (e.g. 0) which was derived from only three horizontal Hall elements, and for receiving the first and the second diagonal difference (e.g. dd1, dd2), and for calculating the second angle (e.g. $\theta 5$) based on the first and second diagonal difference, and for detecting an error based on a comparison of the first and second angular value (e.g. θ, θ5).

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

BRIEF DESCRIPTION OF THE DRAWINGS

FIG. 1(a) and FIG. 1(b) show examples of a magnetic position sensor system comprising a two-pole magnet, and a magnetic sensor device having four horizontal Hall elements, spaced 90° apart on an imaginary circle.

Figure 1C:
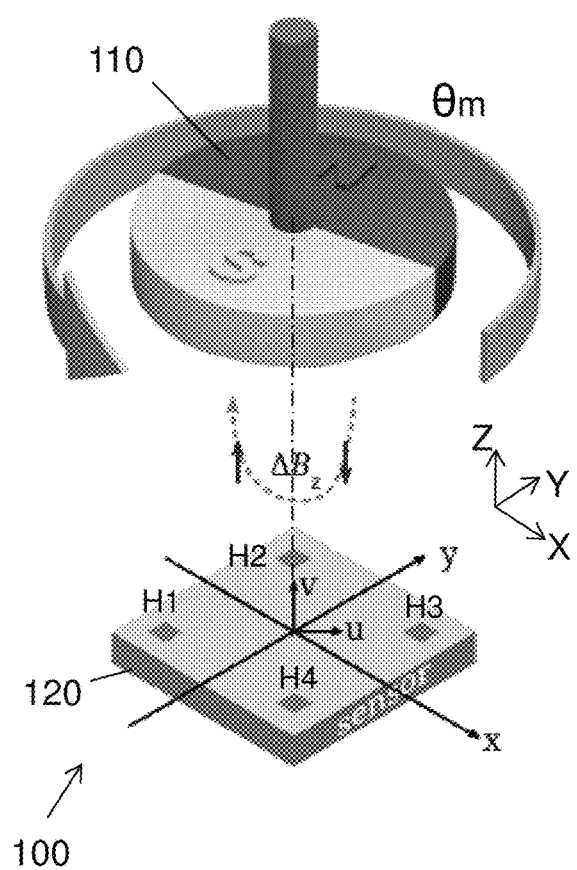
FIG. 1(c) shows how the angular position of the sensor device can be determined using an arctangent function of the ratio of two difference signals calculated between diametrically opposite elements, referred to herein as "diametric difference signals".
Figure 1C:
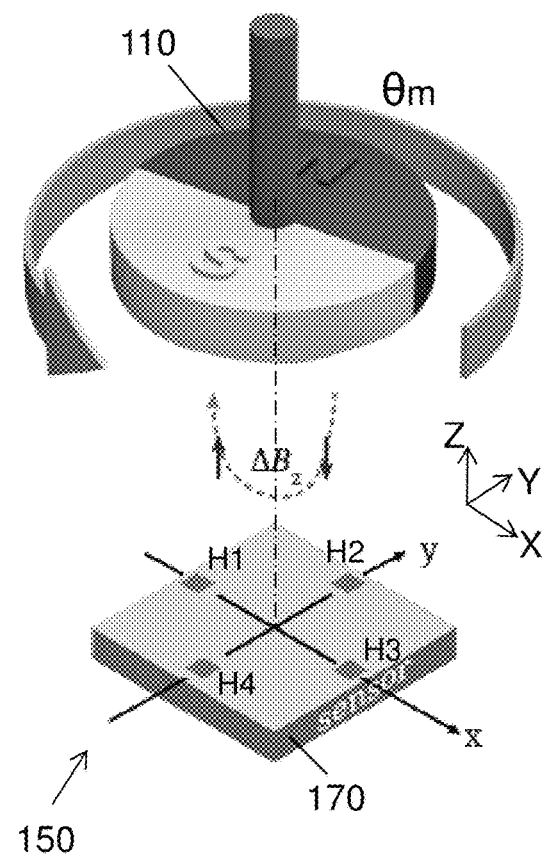
Figure 1C:
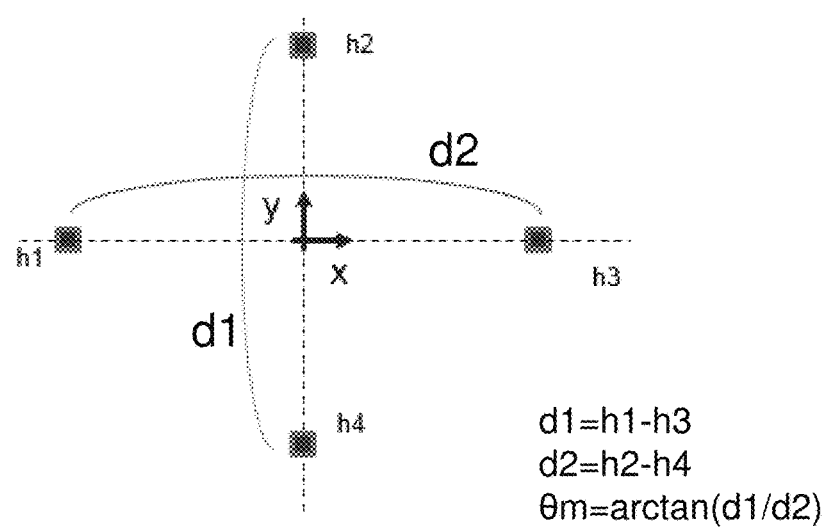

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates to angular position sensor systems comprising a two-pole magnet and a sensor device, where magnet is rotatable relative to the sensor device, or vice versa. For ease of the description, the invention will be explained assuming that the sensor device is stationary, and the magnet is rotatable about a rotation axis, but the present invention is not limited thereto.

In this document, Hall elements H1, H2, etc. are typically referred to in uppercase letters, and the signals h1, h2, etc. provided by these Hall elements are typically referred to in lowercase letters. Unless explicitly mentioned otherwise, h1 is the signal provided by H1, h2 is the signal provided by H2, etc.

In this document, the vertical axis of most graphs containing waveforms are shown in arbitrary units.

FIG. 1(a) shows an example of an angular position sensor system 100 comprising a two-pole magnet 110, and a magnetic sensor device 120 having four horizontal Hall elements H1, H2, H3, H4, located on an imaginary circle (not shown), and angularly spaced by multiples of 90°.

The magnet 110 may be a diametrically magnetized ring or disk magnet, or an axially magnetized ring or disk magnet.

The sensor device 120 comprises a semiconductor substrate, and the horizontal Hall elements H1, H2, H3, H4 are preferably integrated in the substrate. The substrate shown in FIG. 1(a) has a square shape. A coordinate system X,Y,Z is connected to the substrate. The X and Y axis are parallel to the substrate. The Z-axis is perpendicular to the substrate and coincides with the rotation axis of the magnet. The centre of the imaginary circle is located on the rotation axis. In FIG. 1(a) a U and V axis is also shown. They are also located in the X-Y plane and are 45° rotated with respect to the X and Y axis.

The Hall element H1 measures a magnetic field component Bz1 oriented parallel to the Z-axis and provides a signal h1. The Hall element H2 measures a magnetic field component Bz2 oriented parallel to the Z-axis, and provides a signal h2, etc. The sensor device 120 further comprises a biasing circuit, and a readout circuit, and a processing circuit for calculating an angular position. Such circuits are well known in the art, and hence need not be explained in more detail here. Illustrative examples will be described in FIG. 6 to FIG. 8 for completeness.

It is known in the art (e.g. from WO98/54547) that the angular position θm of the magnet 110 relative to the sensor device 120 may be calculated as: θm=arctan((h1-h3)/(h2-h4)).

FIG. 1(b) shows a sensor system 150 with a slightly different sensor device 170. As can be seen, in the sensor device 120 of FIG. 1(a) the horizontal Hall elements H1-H4 are located on diagonals of the square, whereas in the sensor device of FIG. 1(b), the horizontal Hall elements H1-H4 are located near the middle of the sides of the square.

If the size of the semiconductor substrates of FIG. 1(a) and FIG. 1(b) is the same, the signals h1-h4 provided by the Hall elements of FIG. 1(a) will typically be larger than the signals h1-h4 provided by the Hall elements of FIG. 1(b), because the Hall elements of FIG. 1(a) are located further from the centre, hence the accuracy of the sensor device of FIG. 1(a) will typically be better than that of FIG. 1(b). Or stated otherwise, if the accuracy of the system of FIG. 1(a) and FIG. 1(b) is the same, the size of the semiconductor substrate 120 of FIG. 1(a) can be smaller than the size of the semiconductor substrate 170 of FIG. 1(b), hence the packaged device ("integrated chip") comprising the semiconductor substrate of FIG. 1(a) may be smaller, more compact, and cheaper. Apart from the size and the accuracy, the solutions of FIG. 1(a) and FIG. 1(b) are equivalent.

FIG. 1(c) shows how the angular position θm of the magnet 110 relative to the sensor device can be determined using an arctangent function of the ratio of two difference signals d1, d2 measured between diametrically opposite elements. These difference signals are referred to herein as "diametric difference signals".

Figure 1D:
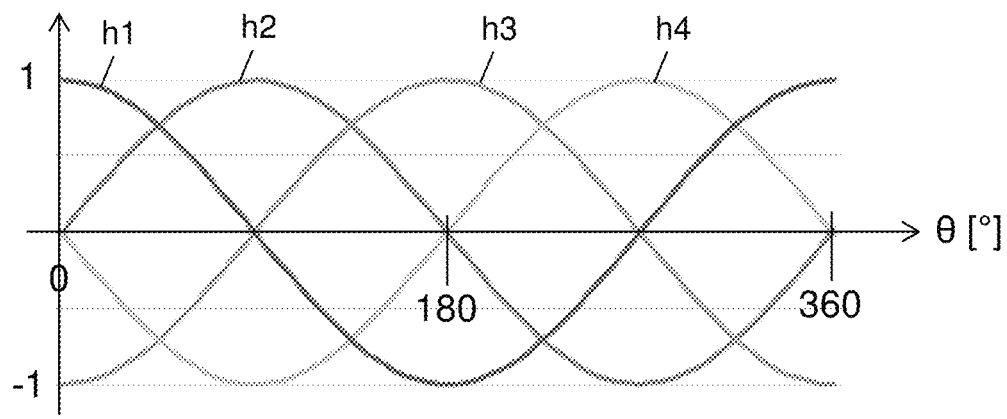
FIG. 1(d) shows illustrative waveforms of the signals obtained from the four Hall elements in the absence of an external disturbance field, as a function of angular position, using an arbitrary scale.

FIG. 1(d) shows illustrative waveforms of the signals h1, h2, h3, h4 obtained from the four Hall elements H1, H2, H3, H4 in the absence of an external disturbance field. As can be seen, ideally these signals have the same amplitude, but are 90° phase shifted. Thus, ideally, the signals h1 and h3 have the same amplitude but opposite sign, and the signals h2 and h4 have the same amplitude but opposite sign, thus by subtracting them, the amplitude doubles.

Figure 1E:
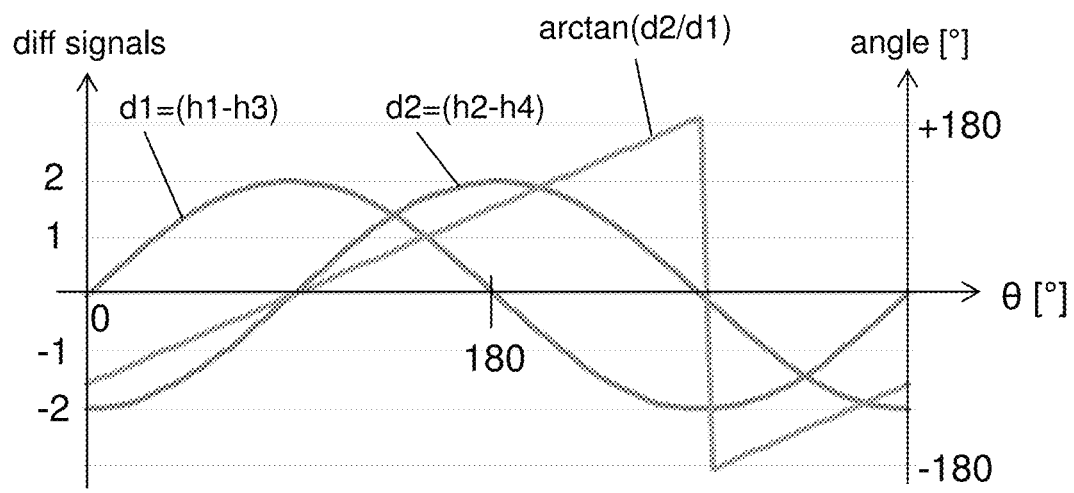
FIG. 1(e) shows illustrative waveforms of the two "diagonal difference signals" and shows the arctangent of the ratio of these signals versus angular position.

FIG. 1(e) shows illustrative waveforms of the two "diagonal difference signals" d1=(h1-h3) and d2=(h2-h4) and shows the arctangent of the ratio of these signals. As can be seen, the signal d1 has twice the amplitude of the signal h1, and the signal d2 has twice the amplitude of the signal h2, and the signals d1, d2 are 90° phase shifted.

Figure 2A:
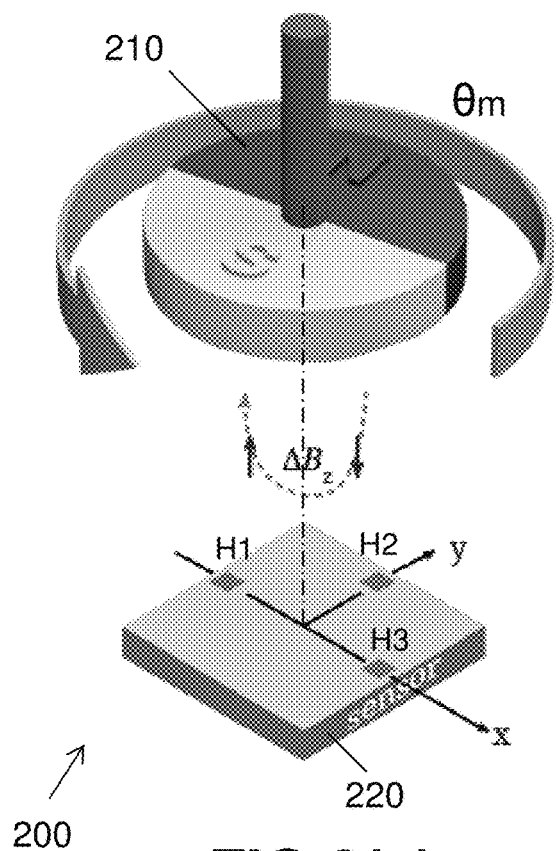
FIG. 2(a) shows a magnetic sensor system comprising a two-pole magnet, and a magnetic sensor device having only three horizontal Hall elements, spaced 90° apart on an imaginary circle, which can be seen as a variant of the sensor arrangement shown in FIG. 1(b).

FIG. 2(a) shows a magnetic sensor system 200 comprising a two-pole magnet 210, and a magnetic sensor device 220 having only three horizontal Hall elements H1, H2, H3 located on an imaginary circle and spaced 90° apart. This sensor system 200 can be seen as a variant of the sensor system 150 shown in FIG. 1(b), from a hardware point of view.

As mentioned above, the magnet 210 may be a diametrically magnetized ring or disk magnet, or an axially magnetized ring or disk magnet.

Figure 2B:
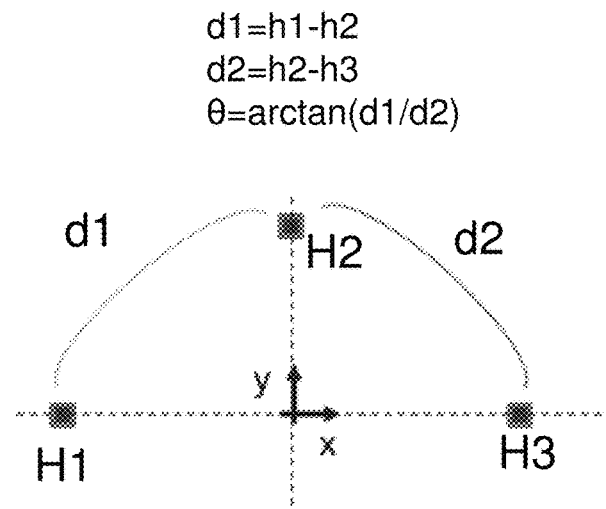
FIG. 2(b) illustrates how difference signals can be calculated between adjacent Hall elements (referred to herein as "adjacent difference signals" as opposed to "diametric difference signals").

According to an underlying idea of the present invention, the inventors came to the idea of calculating difference signals d1, d2 between the signals obtained from adjacent Hall elements, as illustrated in FIG. 2(b). These difference signals d1=(h1-h2) and d2=(h2-h3) are referred to herein as "adjacent difference signals" as opposed to "diametric difference signals". The inventors surprisingly found that the "adjacent difference signals" have the same amplitude, and are 90° phase shifted, hence are quadrature signals. This was unexpected.

Figure 2C:
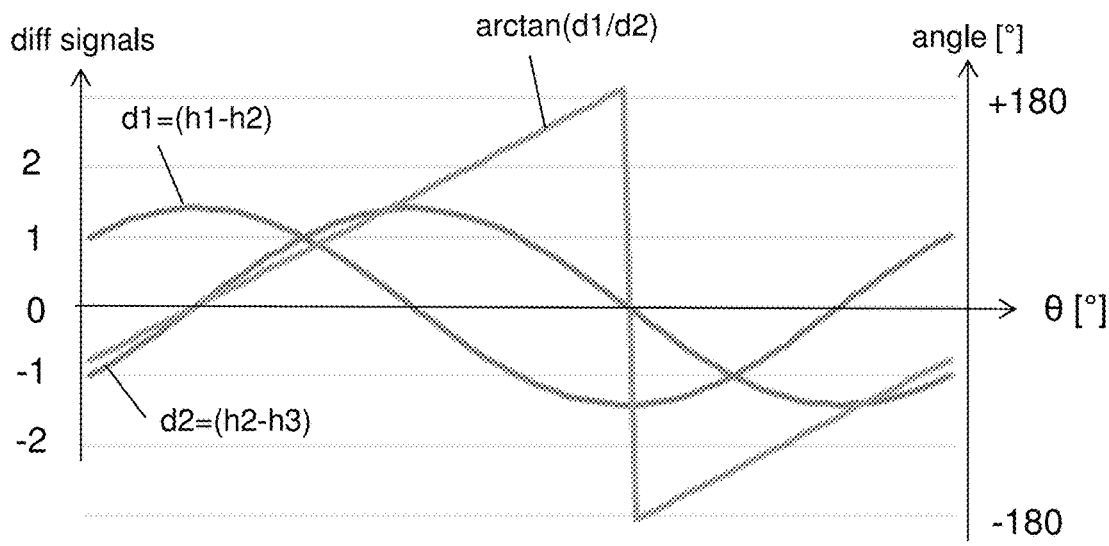
FIG. 2(c) shows illustrative waveforms of the two "adjacent difference signals" and shows the arctangent of the ratio of these signals versus angular position.

FIG. 2(c) shows illustrative waveforms of these two "adjacent difference signals" d1, d2 and shows the arctangent of the ratio of these signals. It is an advantage that the "adjacent difference signals" are highly insensitive to an external disturbance field, hence, also the angle θm derived therefrom is highly insensitive to an external disturbance field. The angle θm may be calculated as:

θm=arctan[(h1-h2)/(h2-h3)], which can also be written (using the two-argument arctangent function) as: θm=atan2 [(h1-h2), (h2-h3)].

Figure 2D:
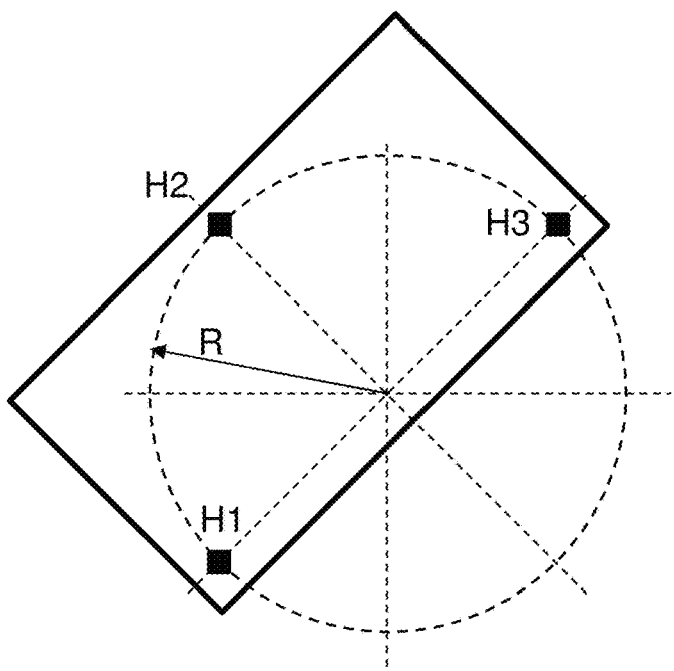
FIG. 2(d), FIG. 2(e) and FIG. 2(f) are schematic diagrams showing examples of semiconductor substrates comprising three horizontal Hall elements arranged as in FIG. 2(a) or similar to FIG. 1(a).
Figure 2E:
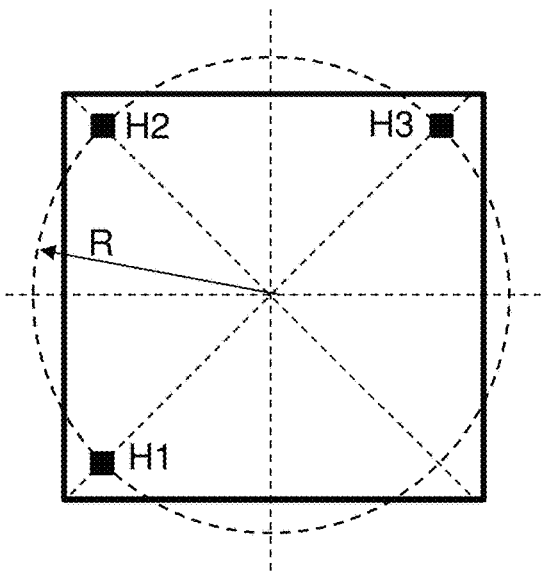
Figure 2F:
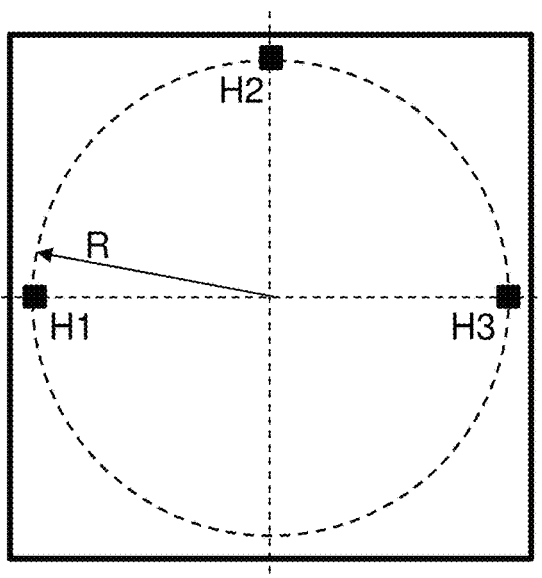

FIG. 2(d), FIG. 2(e) and FIG. 2(f) are schematic diagrams showing examples of rectangular semiconductor substrates comprising only three horizontal Hall elements located on an imaginary circle, and spaced 90° apart. Assuming the radius of the imaginary circle is R, the semiconductor substrate of FIG. 2(d) is preferably about 2% to 20% larger than (2R*R); the semiconductor substrate of FIG. 2(e) is preferably 2% to 20% larger than (√2R)*(√2R); and the semiconductor substrate of FIG. 2(d) is preferably 2% to 20% larger than (2R*2R). As can be appreciated, the semiconductor substrate of FIG. 2(f) has the same size as that of FIG. 1(b), but the semiconductor substrates of FIG. 2(d) and FIG. 2(e) are much smaller, e.g. at least 10% or at least 20% or at least 30% smaller, while offering the same functionality of being able to measure an angular position, in a manner which is robust against an external disturbance field.

Figure 3A:
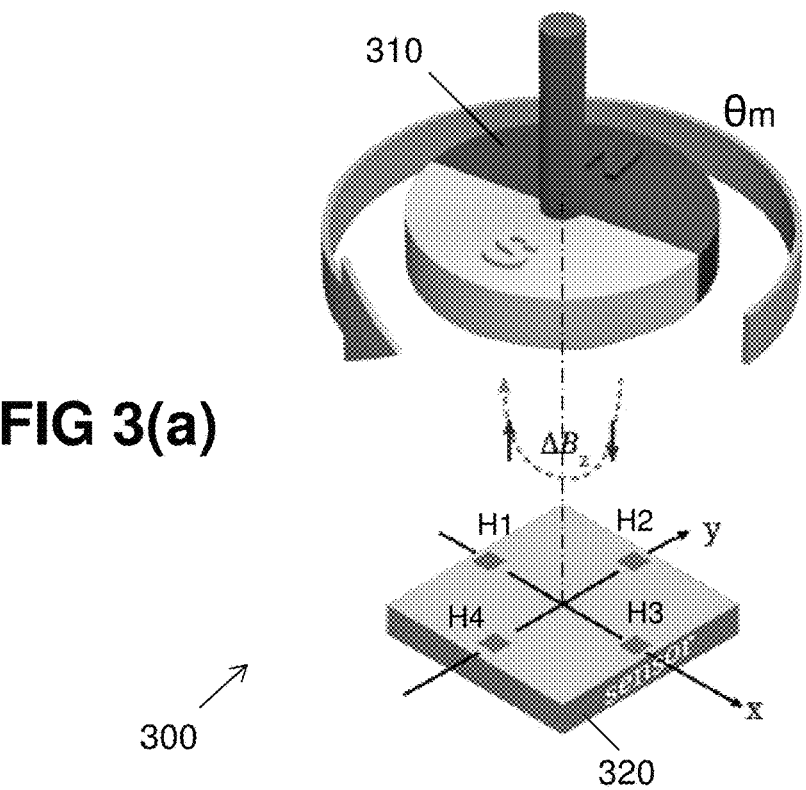
FIG. 3(a) shows a magnetic sensor system comprising a two-pole magnet, and a magnetic sensor device having four horizontal Hall elements, spaced 90° apart on an imaginary circle, similar to FIG. 1(b), but the signals obtained from these Hall elements are or may be processed differently.

FIG. 3(a) shows a magnetic sensor system 300 comprising a two-pole magnet 310, and a magnetic sensor device 320 having four horizontal Hall elements, spaced 90° apart on an imaginary circle, similar to FIG. 1(b), but the signals h1, h2, h3, h4 obtained from these Hall elements are processed differently. The magnet 310 may be a diametrically magnetized ring or disk magnet, or an axially magnetized ring or disk magnet.

Figure 3B:
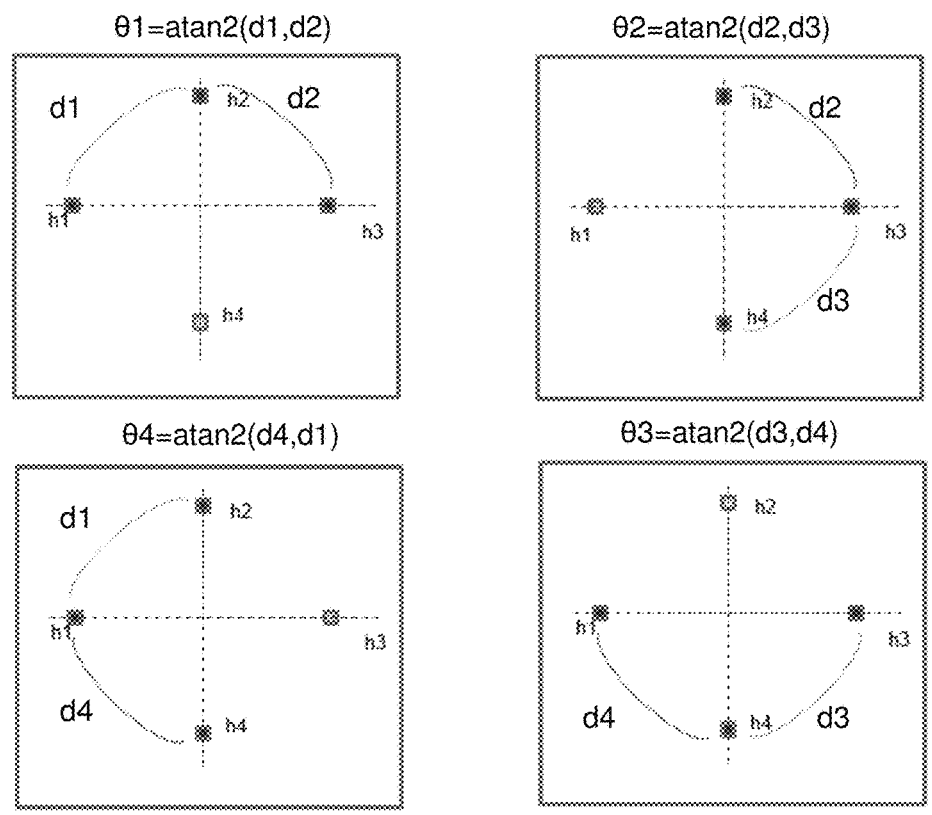
FIG. 3(b) shows four ways of calculating an angular position, each using a different subset of only three sensor signals out of the four sensor signals.

FIG. 3(b) shows four ways of calculating an angular position, each using a different subset of only three signals selected from the available four signals h1, h2, h3, h4.

A first angular position θ1 can be calculated using the signals h1, h2, h3 obtained from the sensor elements H1, H2, H3, without using the signal h4 obtained from H4, e.g. in accordance with the following formula: θ1=atan2[(h1-h2), (h2-h3)].

A second angular position θ2 can be calculated using the signals h2, h3, h4 obtained from the sensor elements H2, H3, H4 without using the signal h1 obtained from H1, e.g. in accordance with the following formula: θ2=atan2[(h2-h3), (h3-h4)].

A third angular position θ4 can be calculated using the signals h1, h3, h4 obtained from the sensor elements H1, H3, H4, without using the signal h2 obtained from H2, e.g. in accordance with the following formula: θ3=atan2[(h3-h4), (h4-h1)].

A fourth angular position θ4 can be calculated using the signals h1, h2, h4 obtained from the sensor elements H1, H2, H4, without using the signal h3 obtained from H3, e.g. in accordance with the following formula: θ4=atan2[(h4-h1), (h1-h2)].

In order to correspond with the mechanical angular position θm, typically an associated offset may be added to or subtracted from each angular value. For example, θm=(θ1−offset1)=(θ2−offset2)=(θ3−offset3)=(θ4−offset4), wherein offset 1 to offset4 are predefined values. In an example, offset1=0°, offset2=90°, offset3=180°, offset4=270°, but other values may also be used. The predefined offset values may be hardcoded, or may be determined during calibration, and stored in a non-volatile memory of the sensor device. The values θ1oc=(θ1−offset1), θ2oc =(θ2−offset2) etc. may be referred to as "offset compensated values", and should ideally be identical, if all sensors are working correctly.

In an embodiment, the sensor device 320 calculates at least two of the four offset compensated values θ1oc, θ2oc, θ3oc, θ4oc, and compares these values, and outputs a signal indicative of the consistency or correspondence or correctness of the result, or a signal indicative of an inconsistency or an error or a fault. For example, if it is found that the at least two offset compensated values deviate less than a predefined amount (e.g. less than 5°, or less than 2°, or less than 1°), which amount may be hardcoded or may be configurable or programmable, the sensor device will decide that no fault is detected. The sensor device may provide any of the angular values θ1, θ2, θ3, θ4, or any of the offset compensated values θ1oc, θ2oc, θ3oc, θ4oc, or an average or a median, as a result. It is a major advantage of the sensor device 320 that it has error detection capabilities.

It is also possible to perform the offset compensation and/or the comparison outside of the sensor device, for example in another processor, connected to the sensor device.

But the inventors went one step further, and realized that it is not only possible to detect an error, e.g. a defective Hall element, but it is also possible to detect which Hall signal is incorrect, and to provide an angular position which does not use the signal from the defective Hall element.

In an embodiment, determining which sensor element is defective is based on analysing the four difference signals (h1-h2), (h2-h3), (h3-h4) and (h4-h1), which should have the sample amplitude, and be 90° phase shifted relative to one another, if all sensor elements are functioning correctly, as illustrated in FIG. 2(c) for two of these difference signals.

For example, if the fourth Hall element H4 is defective, then d1=(h1-h2) and d2=(h2-h3) will still be 90° phase shifted (at any angular position), but d2=(h2-h3) and d3=(h3-h4) will typically not be 90° phase shifted, and d3=(h3-h4) and d4=(h4-h1) will typically not be 90° phase shifted, and d4=(h4-h1) and d1=(h1-h2) will typically not be 90° phase shifted either. Thus, if it is found that d1 and d2 are 90° phase shifted, but d2 and d3 are not 90° phase shifted, and/or d3 and d4 are not 90° phase shifted, and/or d4 and d1 are not 90° phase shifted, the sensor device may output the correct angular position θ1oc, and may additionally output that an error has occurred, or more in particular that H4 is likely defective (in this example).

Similarly, if it is found (at any angular position) that d2 and d3 are 90° phase shifted, while d3 and d4 are not 90° phase shifted, and/or d4 and d1 are not 90° phase shifted, and/or d1 and d2 are not 90° phase shifted, the sensor device may output the correct angular position θ2oc, and may flag that an error has occurred, in particular that H1 is likely defective in this example.

Similarly, if it is found (at any angular position) that d3 and d4 are 90° phase shifted, while d1 and d2 are not 90° phase shifted, and/or d2 and d3 are not 90° phase shifted, and/or d4 and d1 are not 90° phase shifted, the sensor device may output the correct angular position θ4oc, and may flag that an error has occurred, in particular that H2 is likely defective in this example.

Similarly, if it is found (at any angular position) that d4 and d1 are 90° phase shifted, while d1 and d2 are not 90° phase shifted, and/or d2 and d3 are not 90° phase shifted, and/or d3 and d4 are not 90° phase shifted, the sensor device may output the correct angular position θ3oc, and may flag that an error has occurred, in particular that H3 is likely defective in this example.

In case no error was found, e.g. if it is found that d1 and d2 are 90° phase shifted, and d2 and d3 are 90° phase shifted, and d3 and d4 are 90° phase shifted, and d4 and d1 are 90° phase shifted, the device may output any of the offset compensated angles as the angular position, or combinations thereof, e.g. average or median. It is also possible in this case to output the angular value calculated as shown in FIG. 1(c), using diametrical differences.

Thus, the calculations of the four angles as described above and illustrated in FIG. 3(b) can be used for error detection, and in case an error is detected, instead of providing an incorrect value based on the diametrical differences, as would be the case in the sensor device of FIG. 1(c), a correct angle value is provided, which is based on only three signals. It shall be clear that such a sensor device can ideally be used for "functional safety purposes".

In another variant, also illustrated by FIG. 3(a), the sensor device comprises four horizontal Hall elements H1, H2, H3, H4 situated on an imaginary circle, and angularly spaced by multiples of 90°. The sensor device further comprises a processing unit connected to the four Hall elements, and is configured for:
 i) calculating two "adjacent differences", e.g. d1 and d2 of FIGS. 3(b), or d2 and d3 of FIGS. 3(b), or d3 and d4 of FIG. 3(b), or d4 and d1 of FIG. 3(b); and
 ii) optionally calculating a "first angle" as a function of these adjacent differences, e.g. resulting in any of the angles θ1 to θ4 of FIG. 3(b); and
 iii) calculating two "diagonal differences", e.g. d1 and d2 of FIG. 1(c); and
 iv) optionally calculating a "second angle" as a function of these diagonal differences, e.g. as an arctangent of a ratio of these differences.

The sensor device may be further configured for outputting one or both of the two "adjacent differences" and/or the "first angle"; and for outputting one or both of the "two diagonal differences" and/or the "second angle". A consistency check may be performed inside the sensor device, or outside of the sensor device, e.g. in an ECU.

In a particular embodiment, the sensor device is configured for calculating and outputting the "first angle" (derived from two adjacent differences), and for calculating and outputting the "second angle" (derived from two diagonal differences), for allowing an external processor to perform a consistency check, e.g. by comparing the two angles.

In a particular embodiment, the sensor device is configured for calculating and outputting the "second angle" (derived from two diagonal differences), and for calculating and outputting two adjacent differences (e.g. d1 and d2 as defined in FIG. 3(b)), for allowing an external processor to calculate the "first angle" and to perform a consistency check.

In a particular embodiment, the sensor device is configured for calculating and outputting the "first angle" (derived from two adjacent differences), and for calculating and outputting the "second angle" (derived from two diagonal differences), and for performing a consistency check, e.g. by comparing the two angles, and for outputting at least one of said angles, and for outputting a result of the consistency check.

Figure 4A:
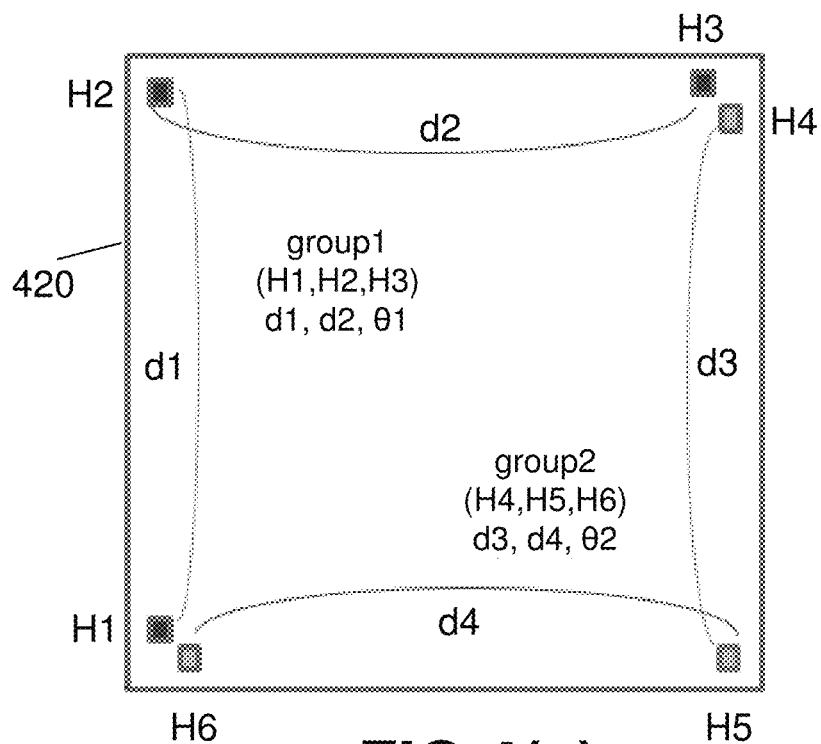
FIG. 4(a) shows a magnetic sensor device which is a variant of the device of FIG. 2(e), having two discrete sets of three Hall elements each, allowing to calculate two angles independently, which may then be compared (internally or externally) for functional safety.

FIG. 4(a) shows a magnetic sensor device 420 which is a variant of the sensor device of FIG. 2(e). The sensor device 420 has a first group (or set) of three horizontal Hall elements H1, H2, H3, and is configured for calculating a difference d1=(h1-h2), and a second difference d2=(h2-h3), and a first angle in accordance with θ1=atan2[(h1-h2), (h2-h3)], in the same manner as described in FIG. 2(a) to FIG. 2(c). But the sensor device 420 also has a second group (or set) of three horizontal Hall elements H4, H5, H6, in addition to H1 to H3, and is configured for calculating a second angle θ2 based on pairwise differences d3=(h4-h5) and d4=(h5-h6), e.g. in accordance with θ2=atan2[(h4-h5), (h5-h6)]. The second angle may be offset compensated by adding or subtracting a predefined value, e.g. 180° for the topology of FIG. 4(a). The sensor device 420 may be further configured for comparing the offset compensated angles θ1 and (θ2-180°), and to detect an error based on said comparison, e.g. to establish that an error has occurred in case the two values θ1 and (θ2-180°) deviate more than a predefined value. In case no error is detected, the first angle θ1 may be output, or the offset compensated second angle (θ2-180°), or an average of these angles.

As mentioned above, the offset compensation and/or the consistency check may be performed outside the sensor device 420, e.g. in a digital controller connected to the sensor device 420. In this case, the sensor device would provide both θ1 and θ2, or θ1 and the offset-compensated second angle, to allow the external comparison.

Alternatively, or additionally, it is also possible to compute one or more angles based on diagonal differences. In one such example, the signals h1, h2, h3 and h5 are used, but not h4 and h6, e.g. as follows: θ3=atan2(h1-h3, h2-h5). In another example, the signals h6, h2, h4 and h5 are used, but not h1 and h3, e.g. as follows: θ4=atan2(h6-h4, h2-h5). It is also possible to use a combination of h1 and h6 (e.g. connected in parallel or summed or averaged), and/or a combination of h3 and h4 (e.g. connected in parallel or summed or averaged), e.g. as follows: θ5=atan2[(h1+h6-h3-h4),2*(h2-h5)].

Figures 4B, 4C:
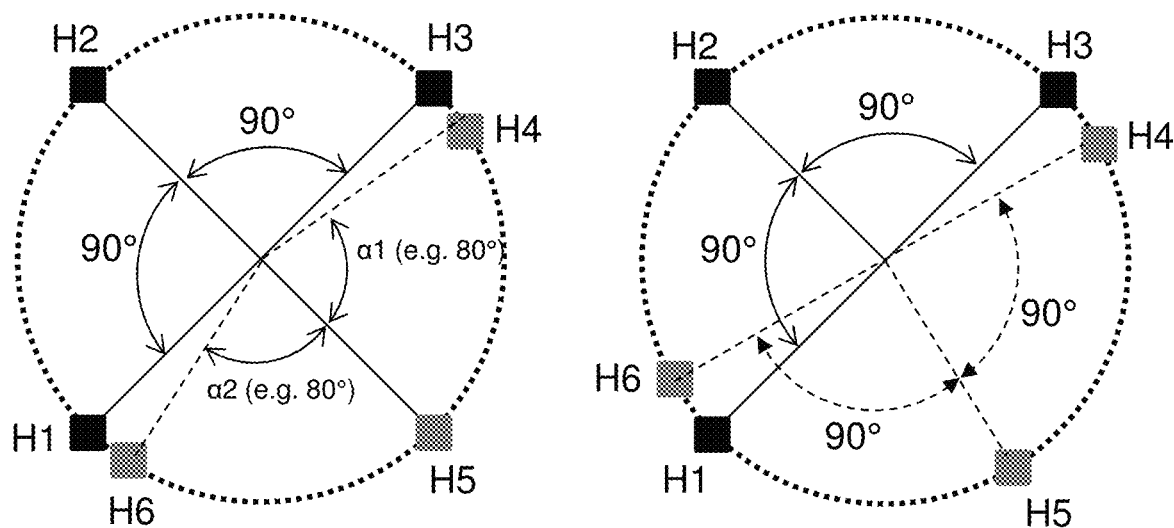
FIG. 4(b) shows an illustrative arrangement of the six sensor elements, wherein the elements of the first group are spaced apart by multiples of 90, and wherein the elements of the second group are spaced apart by less than 90° (e.g. a value in the range from 80° to 89°). The sensor elements of the first and second group are not interleaved.
FIG. 4(c) shows an illustrative arrangement of the six sensor elements, wherein the elements of the first group are spaced apart by multiples of 90°, and wherein the elements of the second group are also spaced apart by 90°, but wherein none of the elements of the first group coincides with elements of the second group. The sensor elements of the first and second group are interleaved.

FIG. 4(b) shows an example or a variant of FIG. 4(a), illustrating an arrangement of the six sensor elements H1 to H6, wherein the elements H1, H2, H3 of the first group are spaced apart by 90°, and wherein the elements H4, H5, H6 of the second group are spaced apart by less than 90°, e.g. by an angle in the range from 80° to 89°. In the drawing, the angle α1 between H4 and H5 (as seen from the center) is about 80°, but this Figure is not drawn to scale. In a practical implementation, the imaginary circle may have a radius in the range from 0.5 to 1.5 mm, e.g. equal to about 1.0 mm, and the size of the Hall plate may be about (20 micron), and the angle α1 may be very close to 89°, e.g. a value in the range from 85° to 89°, or in the range from 87° to 89°. The same applies for the angle α2 between H5 and H6 (as seen from the center). The sensor elements H2 and H5 may be located exactly diametrically opposite each other. The sensor device of FIG. 4(b) may be configured for calculating a first angle θ1 as atan2(h1-h2,h2-h3), and a second angle θ2 as atan2(h4-h5,h5-h6), and for calculating an offset compensated second angle value θ2oc in accordance with the following formula: θ2oc=θ2-180°, and may be further configured for comparing the value of θ1 and θ2oc, and if these values do not differ more than a certain threshold, to conclude that the measurements are correct, and if these values do differ more than said threshold, to decide that an error is detected. The threshold may be a predefined constant value (e.g. a value of 5° or 3°), or may be dependent on the value θ1 (e.g. 3° if θ1 is in a first subrange, and 5° if θ1 is in a second subrange). It is noted that the angle θ2oc will probably deviate somewhat from the angle θ1, since the elements H4, H5, H6 of FIG. 4(b) are not exactly spaced by 90°, but this is very well acceptable for functional safety purposes.

In case no error is detected, the sensor device may output θ1 or θ2oc or the average of θ1 and θ2oc, or a value based on the diametrical difference signals (h2-h5) and (h1-h3).

In case an error is detected, the sensor device may be configured to determine which signal is incorrect, e.g. by using the Hall elements H1, H2, H3 and H5 in the same way as described in FIG. 3(b). And after it is established which sensor signal is incorrect, to determine the angular position using the other three sensor elements. For example, in case the signal h1 was found to be incorrect, the angular position can be calculated based on the signals obtained from H2, H3 and H5.

In a variant, one or both of the angles α1 and α2 may be slightly larger than 90°, e.g. a value in the range from 91° to 100°, or a value in the range from 91° to 95°. The same effects and advantages are also valid for this case.

FIG. 4(c) shows another illustrative arrangement of the six sensor elements H1 to H6, wherein the elements H1, H2, H3 of the first group are mutually spaced apart by multiples of 90°, and wherein the elements H4, H5, H6 of the second group are mutually spaced apart by 90°, but wherein the elements H2 and H5 are not located or not exactly located on opposite sides of the imaginary circle, and none of the elements of the first group coincides with an element of the second group. This sensor device is also capable of determining a first and a second angle θ1, θ2, and to determine if an error has occurred based on these values.

Figure 4D:
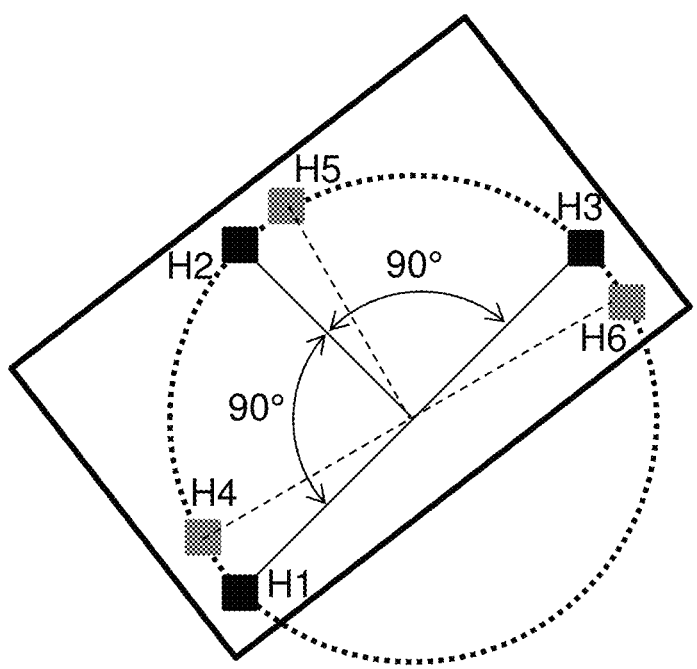
FIG. 4(d) shows an example of a semiconductor substrate comprising two sets of three horizontal Hall elements, arranged in a more compact manner than that of FIG. 4(c).

FIG. 4(d) shows an example of a semiconductor substrate comprising two sets of three horizontal Hall elements, similar to the arrangement of FIG. 4(c), but by locating H4 close to H1, and by locating H5 close to H2, and by locating H6 close to H3, a more compact arrangement can be obtained. With "close" in this embodiment is meant that a distance between centres of the sensor elements is smaller than 250 μm, or smaller than 200 m, or smaller than 100 m, or smaller than 50 μm. Preferably, the six Hall elements are located on an arc length smaller than 220°, or smaller than 210°, or smaller than 200°, or smaller than 190°. The sensor device of FIG. 4(d) has the same advantages as that of FIG. 4(c).

In case no error is detected, it is also possible to combine the signals of H1 and H4, and the signals of H2 and H5, and the signals of H3 and H6, e.g. by connecting these Hall elements in parallel or in series in the analog domain, or by averaging or summing the signals in the digital domain, and to calculate an angle based on the pairwise combined signals, e.g. as θ3=atan2(h1+h4-h2-h5, h2+h5-h3-h6). This angular position may have an improved signal-to-noise ratio (SNR). In an embodiment, the Hall elements H1 and H4, H2 and H5 and H3 and H6 may be located "very close together", e.g. at a distance smaller than 100 μm, or smaller than 75 μm, or smaller than 50 μm.

Figure 4E:
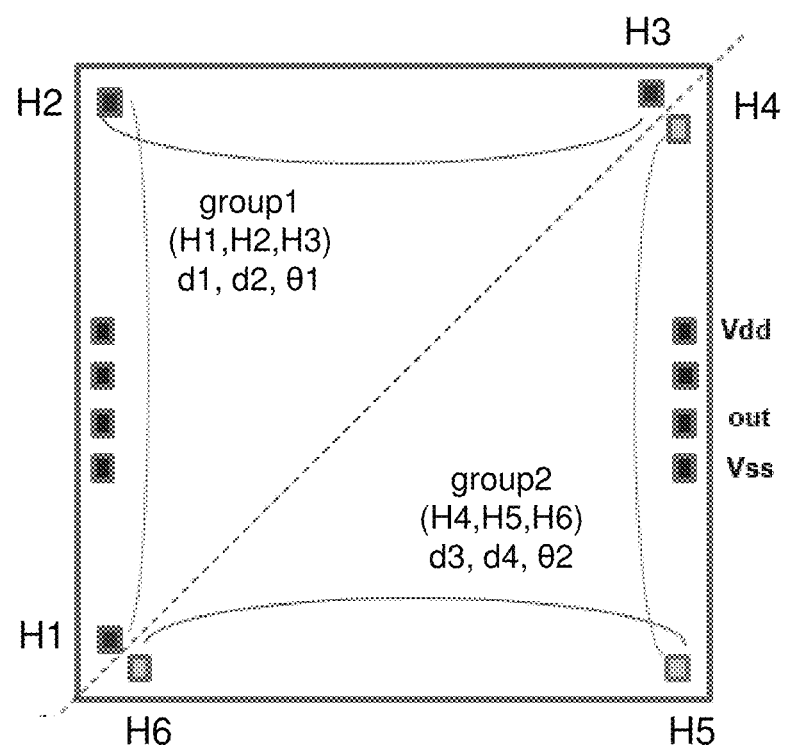
FIG. 4(e) shows a sensor device using the same sensor topology as shown in FIG. 4(a), but wherein the sensor device contains two galvanically separated circuits, each comprising a set of three Hall elements and biasing circuitry and readout circuitry.

FIG. 4(e) shows a sensor device using the same sensor topology as shown in FIG. 4(a), but wherein the sensor device contains two functionally separated circuits, each comprising a set of three Hall elements and biasing circuitry and readout circuitry, and optionally also a separate analog-to-digital convertor and/or digital processing circuit. This will be discussed further in FIG. 7 to FIG. 9(c).

In a variant of FIG. 4(a), (not shown), two additional horizontal Hall elements are added: H7 near or adjacent H2, and H8 near or adjacent H5. These eight sensor elements H1 to H8 may be arranged as four pairs, the pairs being angularly spaced by approximately 90°, and centres of the two Hall elements within each pair being located at a distance smaller than 100 μm or smaller than 75 μm or smaller than 50 μm. Taking into account that the size of each of the Hall elements is relatively small (e.g. about 20 μm×20 μm or about 25 μm×25 μm) and the diameter of the imaginary circle is relatively large (e.g. about 1000 to 3000 μm, it can be understood that the Hall elements of each pair measure substantially the same value. This sensor device may implement one or more of the following modes:

i) calculate four angles using combinations of only three sensors selected from H1 to H4, and/or detecting an error or a problem with any of H1 to H4, in a manner similar to FIG. 3(b), and/or calculating an angle based on diametric differences as in FIG. 1(c), using H1 to H4;

ii) calculate four angles using combinations of only three sensors selected from H5 to H8, and/or detecting an error or a problem with any of H5 to H8, in a manner similar to FIG. 3(b), and/or calculating an angle based on diametric differences as in FIG. 1(c), using H5 to H8;

iii) calculate an angle based on diametric differences of pairwise combined signals (h1+h5), (h2+h6), (h3+h7) and (h4+h8);

iv) combining the signals of each sensor pair and calculate four angles using combinations of only three sensor pair signals; and/or detecting an error or a problem with any of the pairs in a manner similar to FIG. 3(b), and/or calculating an angle based on diametric differences as in FIG. 1(c), using sensor pair signals.

The main advantage of such embodiment having eight sensor elements is that this device is capable of determining which of the individual Hall elements H1 to H8 is defective and/or which of the pairs is defective, and to provide a correct angular position even in case of one defective element/one defective pair, and in case no error is found, to provide an angle based on diametric differences between pairwise combinations, which offers highly reliable value with an improved signal-to-noise ratio (SNR).

Figure 5A:
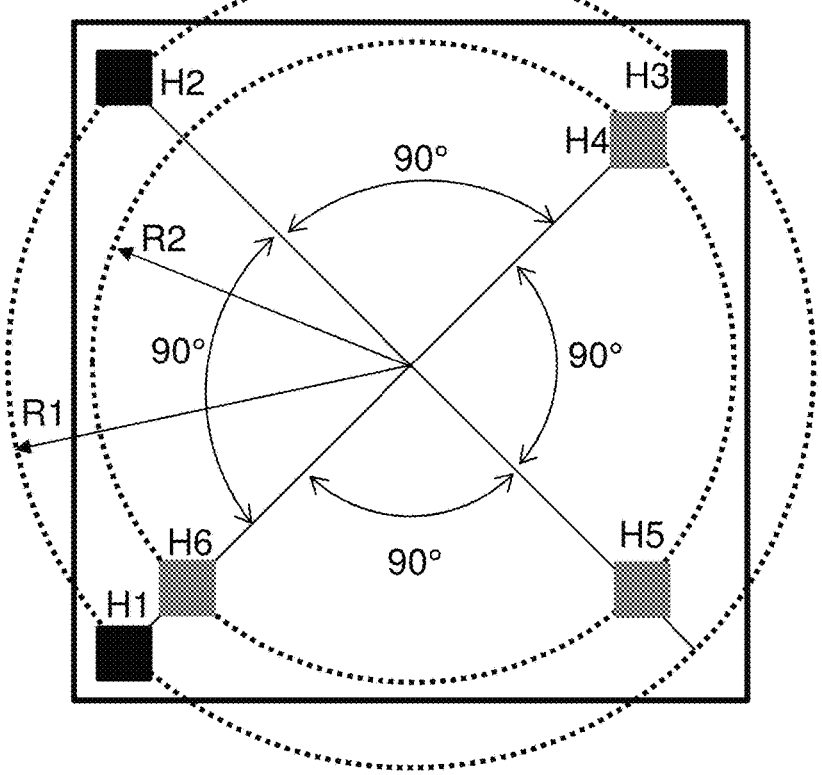
FIG. 5(a) shows a magnetic sensor device which is another variant of the device of FIG. 2(e), or a variant of the device of FIG. 4(a), having a first set of three Hall elements located on a first circle, and a second set of three Hall elements located on a second circle, allowing to calculate two angles independently, which angles may be compared (internally or externally) for functional safety.

FIG. 5(a) shows a magnetic sensor device which is variant of the devices of FIG. 4(a) to FIG. 4(c), also having two sets of three Hall elements, and capable of determining a first angle using a first subset H1, H2, H3 of three Hall elements, and a second angle using a second subset of three Hall elements H4, H5, H6, independent from the first subset, e.g. in accordance with the formula θ1=atan2(h1-h2,h2-h3), and θ2=atan2(h4-h5,h5-h6).

The main differences between the sensor device of FIG. 5(a) and those of FIG. 4(a) to FIG. 4(c) is that the first set of three Hall elements H1, H2, H3 is located on a first circle having a first radius R1, and that the second set of three Hall elements H4, H5, H6 is located on a second circle having a second radius R2 different, e.g. smaller than the first radius R1. The first and the second circle are concentric circles, i.e. they have the same centre. An advantage of using two different radii is that the Hall elements of each subset can be exactly 90° angularly spaced.

In the example shown in FIG. 5(a), four sensor elements H1, H3, H4, H6 are collinear. This offers the further advantage that the sensor device may perform an additional check, because, ideally, the difference signal (h1-h3) should be proportional to the difference signal (h6-h4), using a predefined constant, which may be determined during design, or may be measured during calibration and stored in a non-volatile memory of the sensor device. If (h1-h3) turns out not to be proportional to (h6-h4), an error is detected. This can be written as: (h1-h3)=A*(h6-h4), where A is a constant.

Another advantage of the arrangement of FIG. 5(a) is that the virtual line segment connecting the Hall elements H2 and H5 is perpendicular to the virtual line segment connecting H1 and H3. A third angle may be determined as θ3=atan2(h1-h4,h2-h5), and/or a fourth angle can be determined as θ4=atan2(h6-h3,h2-h5), and/or a fifth angle can be determined as θ5=atan2[(h1-h3),B*(h2-h5)], and/or a sixth angle can be determined as θ6=atan2[(h6-h4),C*(h2-h5)], where B and C are predefined constants, which may be determined during design or can be measured during a calibration test. All of these angles θ1, (θ2-180°), θ3, θ4, θ5, θ6 should yield approximately the same value (within some tolerance margin, e.g. of at most ±3°, or at most ±2°). Thus, an error can be detected by comparing these values, and in a similar manner as above, it is also possible to detect which element is defective in case of an error or fault. If no error is detected, the sensor device may provide one or more of these angles as its output, or an average of two or more of these angles. And in case an error was detected, it is possible to provide a correct angular position, which does not make use of the faulty element.

It is noted that, in case R2 is only slightly smaller than R1, e.g. if (R1-R2) is smaller than 100 μm or smaller than 75 μm, or smaller than 50 μm, the values of h1 and h6 should be very similar, and likewise, the values of h4 and h3 should be very similar, and the sensor device may be configured for verifying that these signals deviate less than a predefined amount. Furthermore, in this case, the values of h1 and h6 may be averaged, and the values of h3 and h4 may be averaged, and the angular position may be calculated in accordance with θ7=atan2[(h1+h6-h3-h4), D*(h2-h5)], where D is a predefined constant or is determined during calibration. Preferably D is a value in the range from 1.9 to 2.1. This angular value may be less sensitive to manufacturing tolerances.

In summary, the sensor device of FIG. 5(a) is not only capable of determining an angle, but is also capable of detecting an error, and providing a correct angle value, even in the presence of an error, hence also has error correction capabilities.

Figure 5B:
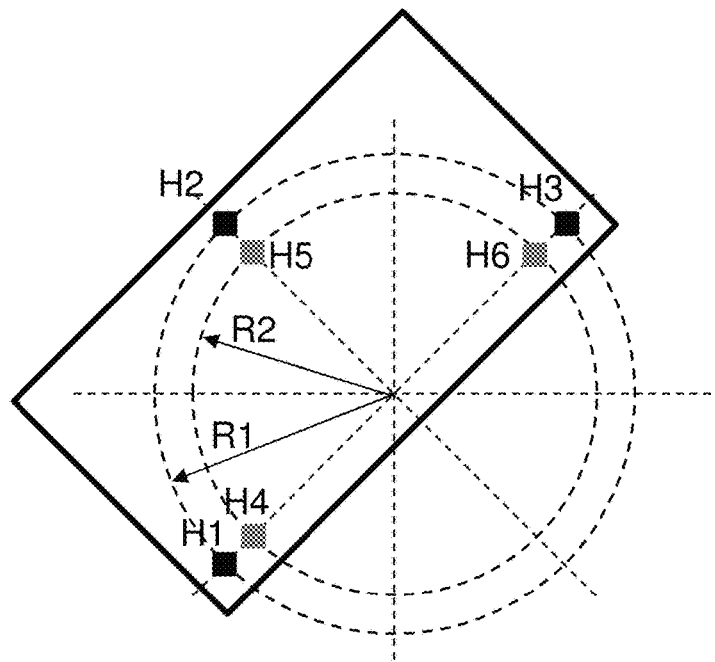
FIG. 5(b) shows an example of a semiconductor substrate comprising two sets of three horizontal Hall elements each, arranged in a more compact manner than that of FIG. 5(a).

FIG. 5(b) shows a variant of the semiconductor substrate of FIG. 5(a), also having three sensor elements H1 to H3 located on a first circle with radius R1 and angularly spaced apart by multiples of 90°, and three sensor elements H4 to H6 located on a second circle with radius R2 and angularly spaced apart by multiples of 90°, and wherein H1, H3, H4, and H6 are located on an imaginary line, but wherein the sensor elements H2 and H5 are situated on the same side of said imaginary line, or in other words, wherein the sensor elements H1 and H4 are arranged "closely together", and wherein the sensor elements H2 and H5 are arranged "closely together", and wherein the sensor elements H3 and H6 are arranged "closely together", preferably at a distance of at most 100 μm, or at most 75 μm, or at most 50 μm. This sensor device offers some of the same advantages as mentioned in FIG. 5(a), inter alia in that it allows to determine θ1 and θ2 and to detect an error, and in case no error is detected, the values of h1 and h4, h2 and h5, h3 and h6 may be averaged, and it even allows to determine which sensor element is defective, because the values of h2, h5 should be substantially 90° phase shifted relative to those of h1, h4, and because the values of h3, h6 should be substantially 90° phase shifted relative to those of h2, h5, which can be tested. But it does not allow to calculate the angle based on diametric differences, because H5 is not located diametrically opposite H2.

Other variants of FIG. 5(a), having eight Hall elements, H1 to H4 on a first circle having a first radius R1, and H5 to H8 located on a second circle having a second radius R2, are also envisioned. This embodiment offers the same advantages as the variant of FIG. 4(a) with eight Hall elements described above but offers the additional advantage that the sensor elements H5 to H8 are exactly 90° spaced. The four modes i) to iv) described above are also possible here.

Figure 6:
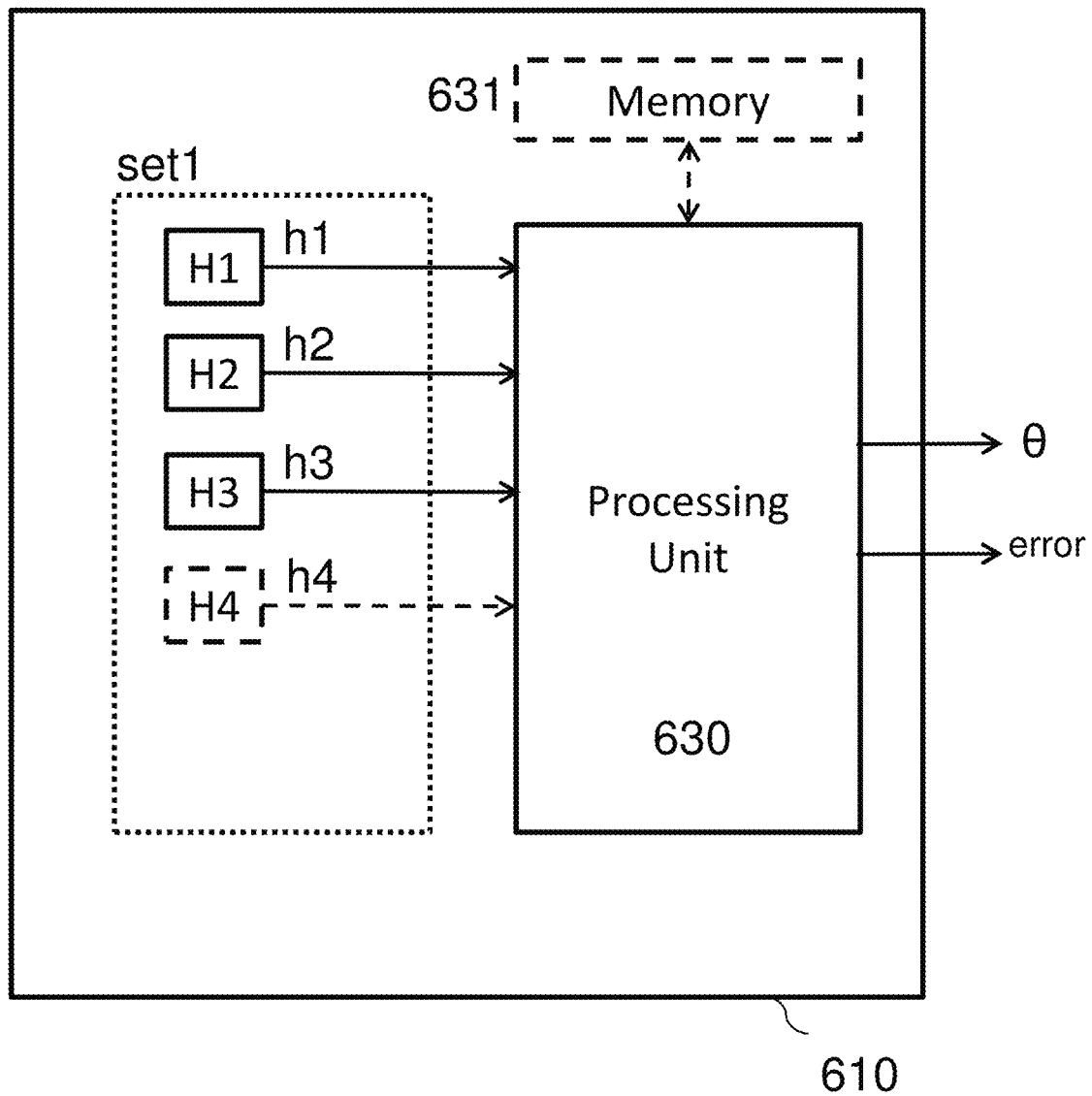
FIG. 6 to FIG. 8 show electrical block-diagrams of circuits that may be used in position sensor devices described above.

FIG. 6 shows an electrical block-diagram of a circuit 610 that may be used in position sensor devices described above. The circuit 610 comprises a plurality of magnetic sensor elements, and a processing unit 630, and a non-volatile memory 631.

The plurality of magnetic sensor elements may comprise: (i) a single set of only three horizontal Hall elements H1, H2, H3, for example as illustrated in FIG. 2(a) to FIG. 2(f); or (ii) a single set of four horizontal Hall elements H1, H2, H3, H4, for example as illustrated in FIG. 3(a) and FIG. 3(b); or (iii) two sets of only three horizontal Hall elements (H1, H2, H3) and (H4, H5, H6), for example as illustrated in FIG. 4(a) to FIG. 5(b), or (iv) two sets of four horizontal Hall elements.

The processing unit 630 is adapted for determining the position, e.g. angular position θ in manners as described above, for example by using mathematical formulas or a look-up table, optionally with interpolation. As explained above, the position is based on a ratio of difference signals. The subtraction may be done in the analog domain before or after amplification, or in the digital domain.

The processing unit 630 may comprise a digital processor, which may optionally comprise or be connected to a non-volatile memory 631. This memory may be configured for storing one or more constants. The digital processor may for example be an 8-bit processor, or a 16-bit processor.

While not explicitly shown, the processing circuit may comprise one or more components or sub-circuits selected from the group consisting of: an amplifier, a differential amplifier, an analog-to-digital convertor (ADC), etc. The ADC may have a resolution of at least 8 bits, or at least 10 bits, or at least 12 bits, or at least 14 bits, or at least 16 bits.

The processing unit 630 may provide the position as an analog signal or as a digital signal, for example via a digital interface, for example a serial bus interface, e.g. using the I²C protocol, or using RS232 protocol, or any other suitable protocol.

Optionally, the processing unit 630 is further configured to provide one or more of the above-mentioned difference signals (h1-h2), (h2-h3), (h3-h1), in analog or digital format to an external processor (not shown), for example an Electronic Control Unit (ECU), via the same interface, or via another interface (not shown), e.g. to allow the external processor to check the data.

Optionally, the processing unit 630 is further configured for providing a control signal (or consistency signal), labelled "error" in FIG. 6, in order to indicate whether an error is detected, or to indicate that no error is detected, or to indicate that an error is detected and corrected.

Figure 7:
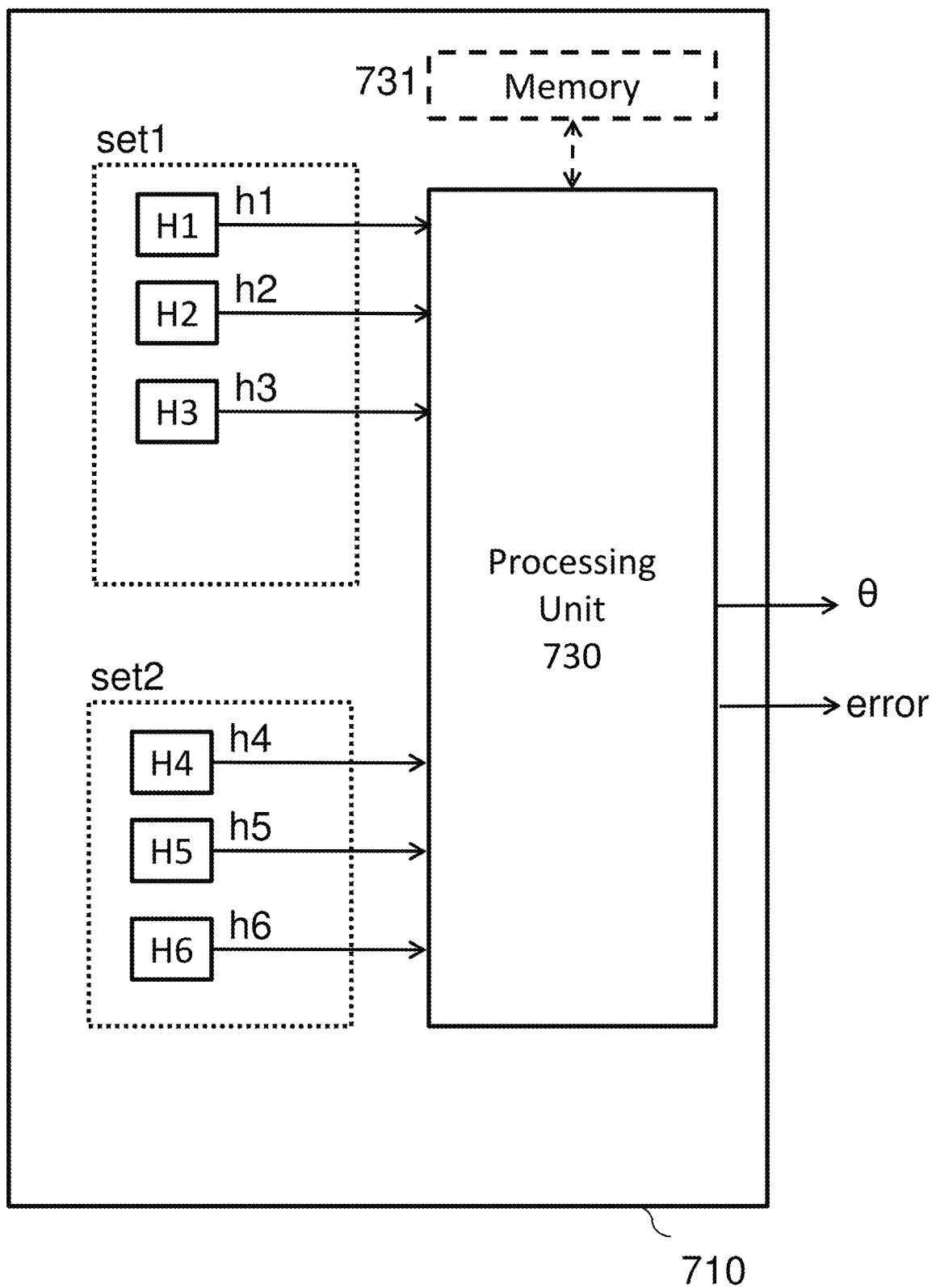

FIG. 7 shows an electrical block-diagram of a circuit 710 that may be used in position sensor devices described above, having two sets of Hall elements. This circuit 710 is a variant of the circuit 610 of FIG. 6. In this circuit, the signals h1 to h6 of both sets of sensor elements are provided to the processing unit 730, which is configured for determining the angular position of the magnet relative to the sensor device (or vice versa), in a manner as explained above, and for providing a control signal, e.g. "error" to indicate that an error is detected, or to indicate that no error is detected, or to indicate that an error is detected and corrected. Optionally, the processing unit 730 is further configured to provide one or more of the above-mentioned difference signals, or averaged signals, in analog or digital format to an external processor (not shown), for example an Electronic Control Unit (ECU), via the same interface, or via another interface (not shown), e.g. to allow the external processor to check the data.

In an alternative embodiment, the magnetic sensor device is configured for providing two angular values (e.g. θ1, θ2) to another processor, (e.g. an ECU), and the latter is configured for comparing the two angular values for detecting an error. In this case, the error-output may be omitted.

In a variant of FIG. 7 (not shown), the first set "set1" contains four Hall elements H1 to H4, and the second set "set2" also contains four Hall elements H5 to H8, and the processing unit may be configured to operate in any mode i) to iv) described above, or may be configured to perform at least two of these modes, e.g. i) and ii), or i) and ii) and iii).

Figure 8:
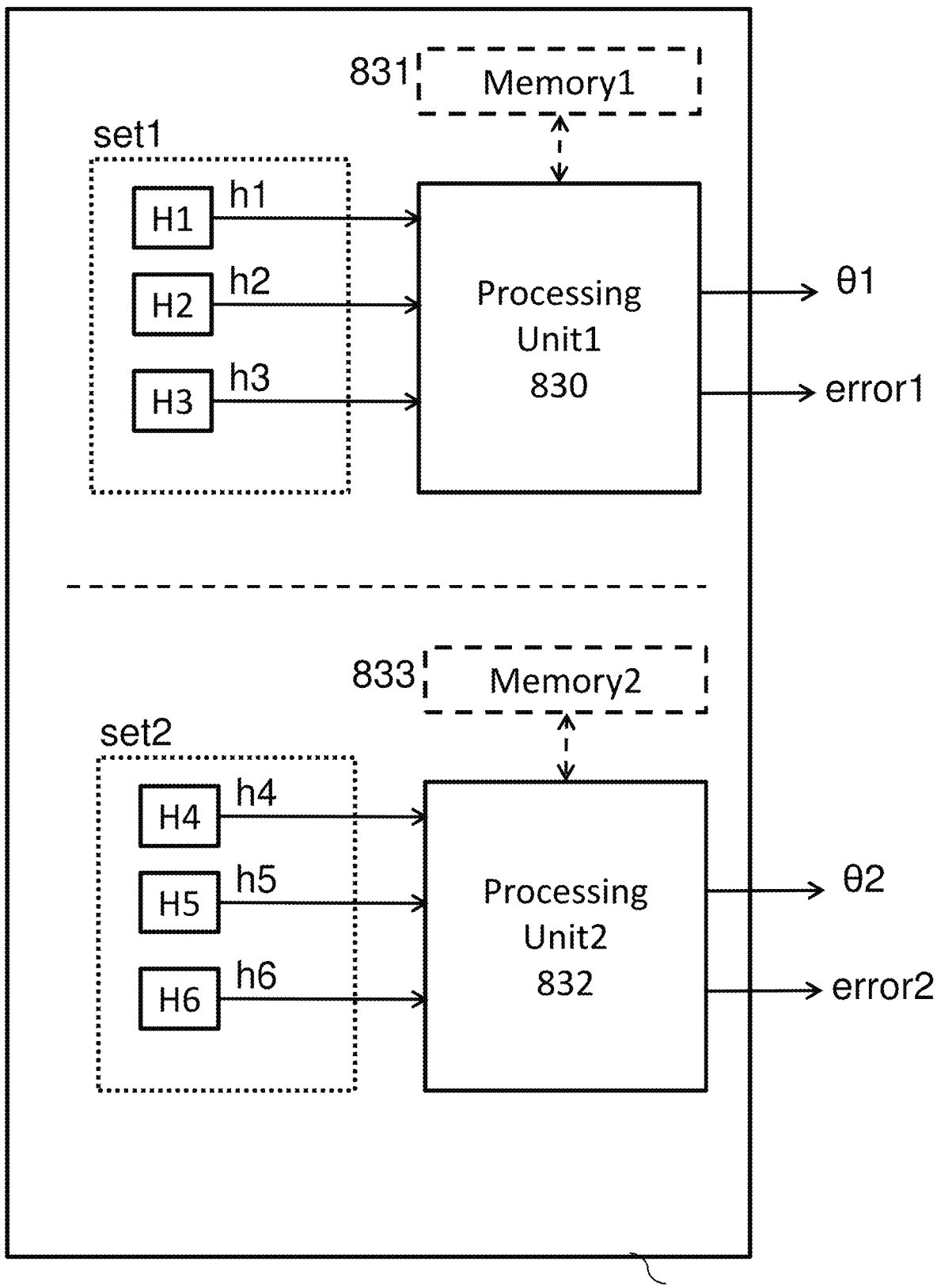

FIG. 8 shows a variant of the electrical block-diagram of FIG. 7, wherein the first set of Hall elements H1-H3 has a dedicated biasing and readout-circuit (not shown), and a dedicated processing circuit 830 (including for example an ADC, an amplifier, a digital processor, or a shift register), and wherein the second set of Hall elements H4-H6 has a dedicated biasing and readout-circuit (not shown), and a dedicated processing circuit 832 (including for example an ADC, an amplifier, a digital processor, or a shift register), separate and independent from the first processing circuit 830. The two partial circuits may optionally be galvanically separated, and may have dedicated bond pads, as suggested in FIG. 4(e).

As explained above, the circuits of FIG. 7 and FIG. 8 are very well suited for applications where "functional safety" is important, but these are not the only possible implementations.

Figure 9A:
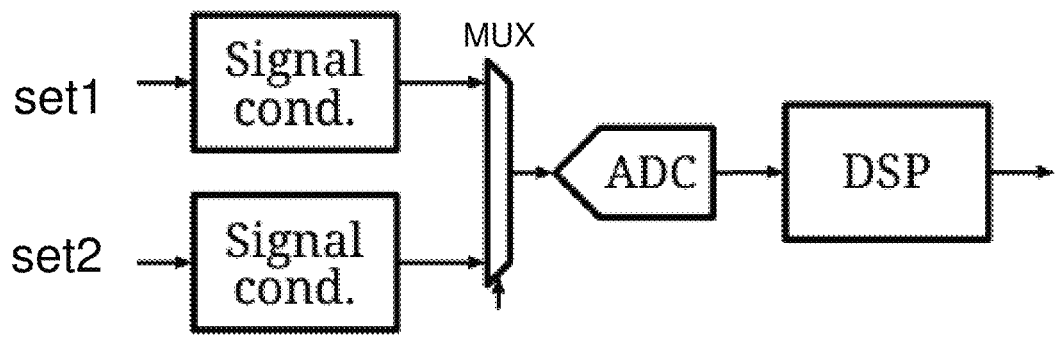
FIG. 9(a) to FIG. 9(c) shows several circuit topologies which may be used to readout and optionally process the signals provided by two sets of magnetic sensor elements.

FIG. 9(a) shows a block-diagram of a readout-circuit, comprising a multiplexer MUX, a single analog-to-digital convertor ADC, and a single digital processor DSP. This block-diagram may be used in the circuit of FIG. 7 and is primarily aimed at detecting errors related to the Hall elements (transducers) and their biasing and readout circuitry.

Figure 9B:
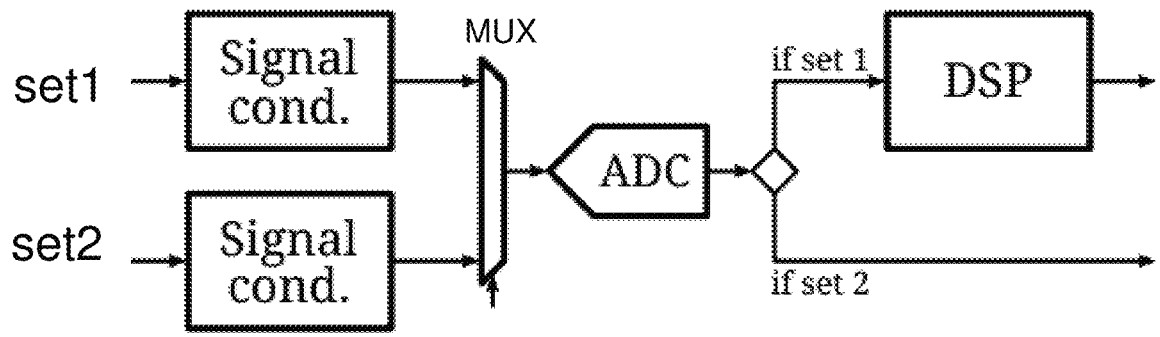
Figure 9C:
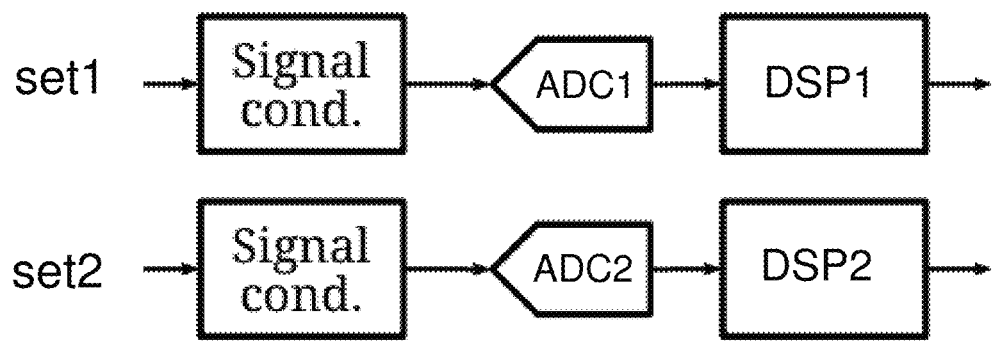

FIG. 9(c) shows a block-diagram of two completely separate readout-circuits, each comprising an analog-to-digital convertor ADC, and digital processor DSP. This block-diagram may be used in the circuit of FIG. 8 and is aimed at providing full redundancy.

FIG. 9(b) shows a block-diagram of another solution, which can be considered as "intermediate solution", having a multiplexer and a single ADC, and a circuit which sends the digitized values originating from the first set of Hall elements into the DSP for further processing, but which sends the digitized values originating from the second set of Hall elements not into the DSP, but to an output (e.g. to the same output, in a time-multiplexed manner), or to a second output different from the first output. These digital values may be further processed externally, e.g. in another processor, e.g. in an ECU. But of course, many variants are possible, e.g. instead of outputting the digitized version of the sensor signals h4, h5, h6, the sensor device may calculate and output the pairwise differences (h4-h5), (h5-h6), (h6-h4) to an external processor. In case of a a sensor device comprising 8 sensor elements, the sensor device may be further configured to output the pairwise combinations (h1+h5), (h2+h6), (h3+h7), (h4+h8), and/or "adjacent differences" of some or all of these pairs, and/or "diagonal differences" of some or all of these pairs.

Finally, in preferred embodiments of the present invention, the sensor device does not contain vertical Hall elements, and does not contain integrated flux concentrators (also known as "IMC") and does not contain magneto-resistive elements (such as MR elements).

In preferred embodiments of the present invention, the sensor device does not contain a ferro-magnetic material. This offers the advantage that the magnetic field lines are not (or not significantly) bent; hence the magnetic field can be measured with minimal influence.

In preferred embodiments of the present invention, the diameter of the imaginary circle is a value in the range from 1.0 mm to 3.0 mm, or in the range from 1.5 mm to 2.5 mm. The outer diameter of the ring or disk magnet is typically in the range from 3.0 mm to 20.0 mm, or from 4 to 20 mm. The ratio between the diameter of the (or the largest) imaginary circle (upon which at least some of the sensor elements are located) and the outer diameter of the ring or disk magnet, is typically a value in the range from 2 to 10, or from 2 to 6, or from 4 to 8, or from 6 to 10.

The invention claimed is:

1. An angular position sensor system, comprising:
a two-pole magnet rotatable about a rotation axis;
a magnetic sensor device comprising a plurality of horizontal Hall elements including at least a first, a second and a third horizontal Hall element located on a virtual circle, the circle having a centre located on the rotation axis;
wherein the first and the second horizontal Hall element are angularly spaced by 90°, and wherein the first and the third horizontal Hall element are angularly spaced by 180°;
wherein the magnetic sensor device further comprises a processing unit connected to the first, second and third horizontal Hall element for obtaining a first, second and third signal, and configured for determining a first pairwise difference between the first and second sensor signal, and for determining a second pairwise difference between the second and third sensor signal, and for determining an angular position of the magnetic sensor device relative to the magnet based on a ratio of the first and the second pairwise difference;
wherein the plurality of horizontal Hall elements further comprises a fourth horizontal Hall element situated on said virtual circle, and spaced 180° from the second horizontal Hall element, and wherein the processing unit is further connected to the fourth horizontal Hall element for receiving a fourth sensor signal; and wherein the processing unit is further configured for one or more or all of the following:
- i) determining a third pairwise difference between the third sensor signal and the fourth sensor signal, and for determining a second angle of the magnetic sensor device based on a ratio of the second pairwise difference and the third pairwise difference;
- ii) determining a third pairwise difference between the third sensor signal and the fourth sensor signal, and determining a fourth pairwise difference between the first sensor signal and the fourth sensor signal, and for determining a third angle of the magnetic sensor device based on a ratio of the third pairwise difference and the fourth pairwise difference, or
- iii) determining a fourth pairwise difference between the first sensor signal and the fourth sensor signal, and for determining a fourth angle of the magnetic sensor device based on a ratio of the fourth pairwise difference and the first pairwise difference.

2. The angular position sensor system according to claim 1, wherein the processing unit is further configured for determining a first diagonal difference as a difference between the first signal and the third signal, and for determining a second diagonal difference as a difference between the second signal and the fourth signal, and for determining a fifth angle of the magnetic sensor device based on a ratio of these diagonal differences.

3. The angular position sensor system according to claim 1,
wherein the processor unit is configured for outputting at least two angular values; and
wherein the system further comprises an electronic control unit (ECU) communicatively connected to the magnetic sensor device, and configured for receiving said at least two angular values, and further configured for detecting an error based on a comparison of the first and second angular value.

4. The angular position sensor system according to claim 1,
wherein the processor unit is configured for outputting at least a first angular value and at least two difference signals; and
wherein the system further comprises an electronic control unit (ECU) communicatively connected to the magnetic sensor device; and
wherein the electronic control unit (ECU) is configured for receiving the first angular value and the at least two difference values and is further configured for calculating a second angular value based on these difference values, and for detecting an error based on a comparison of the first and second angular value.

5. The angular position sensor system according to claim 1, wherein the magnetic sensor device comprises only four horizontal Hall elements.

6. The angular position sensor system according to claim 1, wherein the two-pole magnet comprises a diametrically magnetized ring or disk magnet, or an axially magnetized ring or disk magnet.

7. An angular position sensor system, comprising:
a two-pole magnet rotatable about a rotation axis;
a magnetic sensor device comprising a plurality of horizontal Hall elements including at least a first, a second and a third horizontal Hall element located on a virtual circle, the circle having a centre located on the rotation axis;

wherein the first and the second horizontal Hall element are angularly spaced by 90°, and wherein the first and the third horizontal Hall element are angularly spaced by 180°;

wherein the magnetic sensor device further comprises a processing unit connected to the first, second and third horizontal Hall element for obtaining a first, second and third signal, and configured for determining a first pairwise difference between the first and second sensor signal, and for determining a second pairwise difference between the second and third sensor signal, and for determining an angular position of the magnetic sensor device relative to the magnet based on a ratio of the first and the second pairwise difference;

wherein the plurality of horizontal Hall elements further comprises a fourth horizontal Hall element situated on said virtual circle, and spaced 180° from the second horizontal Hall element, and wherein the processing unit is further connected to the fourth horizontal Hall element for receiving a fourth sensor signal; and wherein the processing unit is further configured for determining a first diagonal difference as a difference between the first signal and the third signal, and for determining a second diagonal difference as a difference between the second signal and the fourth signal, and optionally for determining a second angle of the magnetic sensor device based on a ratio of these diagonal differences; and wherein the sensor device is further configured for outputting said angular position derived from the first, second and third horizontal Hall element as a first angle, and for outputting at least one of said first and said second diagonal difference and said second angle.

8. The angular position sensor system according to claim 7, wherein the sensor device is configured for determining said second angle, and for performing a consistency test between said first angle and said second angle, and for outputting a result of the consistency test.

9. The angular position sensor system according to claim 7,
wherein the system further comprises an electronic control unit (ECU) communicatively connected to the magnetic sensor device; and
wherein the electronic control unit (ECU) is configured for receiving the first angular value and the second angular value, and for detecting an error based on a comparison of the first and the second angular value.

10. The angular position sensor system according to claim 7,
wherein the system further comprises an electronic control unit (ECU) communicatively connected to the magnetic sensor device; and
wherein the electronic control unit (ECU) is configured for receiving the first angular value, and for receiving the first and the second diagonal difference, and for calculating the second angle based on the first and second diagonal difference, and for detecting an error based on a comparison of the first and second angular value.

11. The angular position sensor system according to claim 7, wherein the magnetic sensor device comprises only four horizontal Hall elements.

12. The angular position sensor system according to claim 7, wherein the two-pole magnet comprises a diametrically magnetized ring or disk magnet, or an axially magnetized ring or disk magnet.

* * * * *